(12) United States Patent
Saito et al.

(10) Patent No.: US 9,856,340 B2
(45) Date of Patent: Jan. 2, 2018

(54) PHOTOCURABLE FLUORINATED POLYMER COMPOSITION

(75) Inventors: Shun Saito, Tokyo (JP); Hiroshi Nishio, Tokyo (JP); Sho Masuda, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 175 days.

(21) Appl. No.: 13/399,223

(22) Filed: Feb. 17, 2012

(65) Prior Publication Data

US 2012/0149798 A1    Jun. 14, 2012

Related U.S. Application Data

(63) Continuation of application No. PCT/JP2010/064022, filed on Aug. 19, 2010.

(30) Foreign Application Priority Data

Aug. 20, 2009 (JP) ................. 2009-191148

(51) Int. Cl.
| | |
|---|---|
| C08F 214/18 | (2006.01) |
| C08K 5/00 | (2006.01) |
| C08F 214/26 | (2006.01) |
| C08L 27/12 | (2006.01) |
| C08L 29/10 | (2006.01) |
| C08F 216/14 | (2006.01) |
| C08L 63/00 | (2006.01) |

(52) U.S. Cl.
CPC ...... *C08F 214/186* (2013.01); *C08F 214/262* (2013.01); *C08F 214/265* (2013.01); *C08F 214/267* (2013.01); *C08F 216/1416* (2013.01); *C08K 5/0025* (2013.01); *C08L 27/12* (2013.01); *C08L 29/10* (2013.01); *C08L 63/00* (2013.01)

(58) Field of Classification Search
CPC .............. C08F 214/186; C08F 214/225; C08F 214/245; C08F 214/265; C08F 214/285; C08L 27/12; C08L 27/16; C08L 27/18; C08L 27/20
USPC ..... 522/54, 156, 153, 67, 65, 129, 120, 130, 522/139
See application file for complete search history.

(56) References Cited

U.S. PATENT DOCUMENTS

| | | | | |
|---|---|---|---|---|
| 3,415,794 | A * | 12/1968 | Orth et al. | ..... 526/266 |
| 6,495,636 | B2 | 12/2002 | Sugiyama et al. | |
| 2001/0002423 | A1 * | 5/2001 | Sugiyama et al. | ..... 549/510 |
| 2005/0265685 | A1 | 12/2005 | Ohashi et al. | |
| 2009/0018244 | A1 * | 1/2009 | Polastri | ..... C08K 5/04 524/300 |
| 2009/0212690 | A1 * | 8/2009 | Bruton et al. | ..... 313/504 |
| 2009/0233198 | A1 * | 9/2009 | Kakino | ..... B41M 7/0045 430/66 |
| 2009/0263588 | A1 * | 10/2009 | Kakino | ..... 427/487 |

FOREIGN PATENT DOCUMENTS

| | | |
|---|---|---|
| EP | 1 095 938 A1 | 5/2001 |
| JP | 59-046964 | 3/1984 |
| JP | 62-025104 | 2/1987 |
| JP | 64-051418 | 2/1989 |
| JP | 04-202485 | 7/1992 |
| JP | 05-302058 | 11/1993 |
| JP | 07-017958 | 1/1995 |
| JP | 10-316670 | 12/1998 |
| JP | 2000-26444 | 1/2000 |
| JP | 2000-026546 | 1/2000 |
| JP | 2005-139363 | 6/2005 |
| JP | 2009-256552 | 11/2009 |
| WO | WO 2004/016689 | 2/2004 |

OTHER PUBLICATIONS

Stevens, Polymer Chemistry: An Introduction, Oxford, (1999), p. 172.*
Sugiyama et al., machine English translation of JP 2000-026444 (Jan. 2000).*
Kamata et al., machine English translation of JP 2009-040989 (Feb. 2009).*
International Search Report dated Sep. 21, 2010 in PCT/JP2010/064022 filed Aug. 19, 2010.
Extended Search Report dated Jun. 14, 2013 in European Patent Application No. 10810011.6.

* cited by examiner

*Primary Examiner* — Michael Pepitone
*Assistant Examiner* — Jessica Roswell
(74) *Attorney, Agent, or Firm* — Oblon, McClelland, Maier & Neustadt, L.L.P.

(57) ABSTRACT

To provide a photocurable fluorinated polymer composition which has a high curing rate, shows little shrinkage before and after photocuring and requires no post treatment such as heat treatment after photocuring and whereby it is possible to obtain a cured resin excellent in heat resistance and weather resistance. According to the photocurable fluorinated polymer composition comprising a fluorinated polymer (A) containing polymerized units derived from a fluoroolefin and polymerized units derived from an unsaturated monomer having an oxetanyl group or a substituted oxetanyl group, and a photoreaction initiator (B), of the present invention, it is possible to provide a photocurable fluorinated polymer composition which has a high curing rate, shows little shrinkage before and after photocuring and requires no post treatment such as heat treatment after photocuring and whereby it is possible to obtain a cured resin excellent in heat resistance and weather resistance.

11 Claims, No Drawings

PHOTOCURABLE FLUORINATED POLYMER COMPOSITION

TECHNICAL FIELD

The present invention relates to a photocurable fluorinated polymer composition to be used for forming a coating film on a substrate surface.

BACKGROUND ART

A method for forming a coating film by applying a coating material in order to protect the surface of various materials such as metals, inorganic materials, plastics, woods, paper, etc. or in order to impart a special function such as water and oil repellency, has been used since a long time ago. As a method for curing a coating film, a curing method by heating and a curing method by irradiation with active energy rays have been known. The latter has merits in that as compared with the former, the time required for curing is short, the occupying area in the coating line may be small, and since no heating is required, the substrate is not restricted, and therefore, it is recently widely used for the coating of various substrates as described above, and its application is actively studied in the field of coating of displays, covering of optical fibers or special coating of e.g. electronic components, electric wires, etc.

Heretofore, photocurable fluorinated polymer compositions have been proposed which comprise a fluorinated polymer having polymerizable unsaturated groups, an acrylic acid ester and a photoreaction initiator (Patent Documents 1 to 4). Such photocurable fluorinated polymer compositions have such a problem that they are susceptible to an inhibition reaction by oxygen in air, since the photocuring reaction proceeds by a radical polymerization mechanism, or such a drawback that the shrinkage at the time of curing is substantial.

On the other hand, photocurable fluorinated polymer compositions comprising a fluorinated polymer having epoxy groups, an epoxy compound and a photoreaction initiator, have been proposed (Patent Documents 5 and 6). These photocurable fluorinated polymer compositions have such a merit that they are not susceptible to an influence of oxygen in air, since the photocuring reaction proceeds by a photocation polymerization mechanism of epoxy groups, and a cured product excellent in chemical resistance or adhesion to the substrate can be obtained, and thus, in recent years, they have been used in many applications. However, the photocation polymerization of epoxy groups is poor in the polymerization reactivity or photosensitivity as compared with photoradical polymerization of unsaturated groups, and after the treatment by irradiation with light, heat treatment was further required as post curing. Further, the epoxy compound or the epoxy group-containing monomer as the main material for the epoxy group-containing fluorinated polymer gives an influence to the working environment and thus presents difficulties in handling.

PRIOR ART DOCUMENTS

Patent Documents

Patent Document 1: JP-B-59-46964
Patent Document 2: JP-A-62-25104
Patent Document 3: JP-A-2005-139363
Patent Document 4: JP-A-64-51418
Patent Document 5: JP-A-5-302058
Patent Document 6: JP-A-4-202485

DISCLOSURE OF INVENTION

Technical Problem

The present invention is to provide a photocurable fluorinated polymer composition which has a high curing rate, shows little shrinkage before and after photocuring and requires no post treatment such as heat treatment after photocuring and whereby it is possible to obtain a cured resin excellent in heat resistance and weather resistance, and a cured resin obtained by curing such a photocurable fluorinated polymer composition.

Solution to Problem

The present inventors have found that a photocurable fluorinated polymer composition comprising a fluorinated copolymer containing polymerized units derived from a fluoroolefin and polymerized units derived from an unsaturated monomer having an oxetanyl group or a substituted oxetanyl group, and a photoreaction initiator has a high curing rate, requires no post treatment such as heat treatment and presents a cured resin excellent in heat resistance and weather resistance, and have accomplished the present invention.

That is, the present invention provides the following [1] to [15].

[1] A photocurable fluorinated polymer composition comprising a fluorinated polymer (A) containing polymerized units (a-1) derived from a fluoroolefin and polymerized units (a-2) derived from an unsaturated monomer having an oxetanyl group or a substituted oxetanyl group, and a photoreaction initiator (B).

[2] The photocurable fluorinated polymer composition according to [1], wherein the fluorinated polymer (A) contains the polymerized units (a-2) derived from an unsaturated monomer having an oxetanyl group or a substituted oxetanyl group, in a proportion of from 5 to 95 mol % to all monomer units in the fluorinated polymer (A).

[3] The photocurable fluorinated polymer composition according to [1] or [2], wherein in the fluorinated polymer (A), the proportion of the polymerized units (a-1) derived from a fluoroolefin is from 30 to 70 mol %, and the proportion of the polymerized units (a-2) derived from an unsaturated monomer having an oxetanyl group or a substituted oxetanyl group, is from 70 to 30 mol %, to the total number of moles of the polymerized units (a-1) derived from a fluoroolefin and the polymerized units (a-2) derived from an unsaturated monomer having an oxetanyl group or a substituted oxetanyl group.

[4] The photocurable fluorinated polymer composition according to any one of [1] to [3], wherein the unsaturated monomer having an oxetanyl group or a substituted oxetanyl group, is an unsaturated monomer having an oxetanyl group or a substituted oxetanyl group, and at least one group selected from the group consisting of a vinyloxy group, an allyloxy group, an isopropenyloxy group and a (meth)acryloyloxy group.

[5] The photocurable fluorinated polymer composition according to any one of [1] to [4], wherein the unsaturated monomer having an oxetanyl group or a substituted oxetanyl group, is a compound represented by the following formula (1):

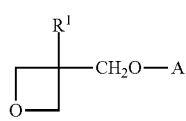
(1)

(in the formula (1), $R^1$ is a hydrogen atom or a $C_{1-6}$ alkyl group which may have an etheric oxygen atom, and A is a group selected from a vinyl group, an allyl group, an isopropenyl group and a (meth)acryloyl group).

[6] The photocurable fluorinated polymer composition according to any one of [1] to [5], wherein the fluoroolefin for (a-1) is at least one fluoroolefin selected from the group consisting of chlorotrifluoroethylene, tetrafluoroethylene, vinylidene fluoride and hexafluoropropene.

[7] The photocurable fluorinated polymer composition according to any one of [1] to [6], wherein the fluorinated polymer (A) contains polymerized units (a-3) derived from an unsaturated monomer which does not have a fluorine atom, an oxetanyl group and a substituted oxetanyl group and which has at least one group selected from the group consisting of an alkenyl group, an alkenyloxy group, a vinyloxycarbonyl group and a (meth)acryloyl group, in a proportion of from 5 to 45 mol % to all polymerized units in the fluorinated polymer (A).

[8] The photocurable fluorinated polymer composition according to [7], wherein the polymerized units (a-3) are polymerized units (a-3a) having a $C_{1-10}$ alkyl group and no crosslinkable functional group.

[9] The photocurable fluorinated polymer composition according to [7], wherein the polymerized units (a-3) are polymerized units (a-3b) having a crosslinkable functional group.

[10] The photocurable fluorinated polymer composition according to any one of [1] to [9], wherein the photoreaction initiator (B) is a photoreaction initiator which generates cations by ultraviolet rays to initiate a curing reaction and is an onium salt of a Lewis acid or an onium salt of a Bronsted acid.

[11] The photocurable fluorinated polymer composition according to any one of [1] to [10], wherein the photoreaction initiator (B) is at least one photoreaction initiator selected from the group consisting of a diaryl iodonium salt, a triaryl sulfonium salt and an aryl diazonium salt.

[12] The photocurable fluorinated polymer composition according to any one of [1] to [11], which further contains a compound (C) which has at least one of at least one group selected from the group consisting of an epoxy group, an oxetanyl group, a substituted oxetanyl group, a vinyl ether group and a cyclic carbonate group and which does not have a fluorine atom.

[13] The photocurable fluorinated polymer composition according to [12], wherein the compound (C) is at least one compound (c-1) selected from the group consisting of a bisphenol A type epoxy resin, a hydrogenated bisphenol A type epoxy resin, a bisphenol F type epoxy resin, a hydrogenated bisphenol F type epoxy resin, a novolac type epoxy resin, a hydrogenated novolac type epoxy resin, a biphenyl type epoxy resin, a naphthalene type epoxy resin, an alicyclic epoxy resin, a triphenolmethane type epoxy resin, a dicyclopentadiene type epoxy resin, a terpene type epoxy resin, a bisarylfluorene type epoxy resin, an epoxy group-containing organopolysiloxane and an epoxy group-containing polymer.

[14] The photocurable fluorinated polymer composition according to [12], wherein the compound (C) is at least one compound (c-2) selected from the group consisting of compounds represented by the following formulae (2) to (4) and a polymer which has the polymerized units (a-2) derived from an unsaturated monomer having an oxetanyl group or a substituted oxetanyl group and which has no fluorine atom:

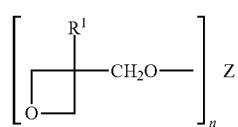
(2)

(in the formula (2), $R^1$ is a hydrogen atom or a $C_{1-6}$ alkyl group which may have an etheric oxygen atom, Z is an n-valent hydrocarbon group which may have a substituent, and n is an integer of from 1 to 4),

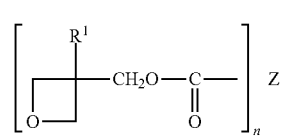
(3)

(in the formula (3), R1 is a hydrogen atom or a C1-6 alkyl group which may have an etheric oxygen atom, Z is an n-valent hydrocarbon group which may have a substituent, and n is an integer of from 1 to 4).

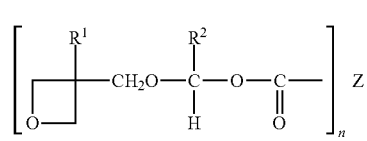
(4)

(in the formula (4), $R^1$ is a hydrogen atom or a $C_{1-6}$ alkyl group which may have an etheric oxygen atom, $R^2$ is a $C_{1-6}$ linear or branched alkyl group which may have an etheric oxygen atom, Z is an n-valent hydrocarbon group which may have a substituent, and n is an integer of from 1 to 4).

[15] A process for producing a cured resin, which comprises curing the photocurable fluorinated polymer composition as defined in any one of [1] to [14] by irradiation with light.

Advantageous Effects of Invention

The photocurable fluorinated polymer composition of the present invention has a very high curing rate by irradiation with light and requires no post treatment such as heat treatment after photocuring. Further, its shrinkage by photocuring is little, and the obtained cured resin is excellent in heat resistance and weather resistance. Further, the photocurable fluorinated polymer composition of the present invention and its starting materials give little influence to the working environment, and their handling is easy.

DESCRIPTION OF EMBODIMENTS

In this specification, repeating units obtained by polymerization i.e. polymerized units may sometimes be referred to as "units". Further, in this specification, (meth)acrylic acid means "acrylic acid" or "methacrylic acid" and (meth) acryloyl means "acryloyl" or "methacryloyl".

Now, the photocurable fluorinated polymer composition of the present invention will be described in detail.

The photocurable fluorinated polymer composition of the present invention comprises a fluorinated polymer (A) having oxetanyl groups or substituted oxetanyl groups, and a photoreaction initiator (B).

1. Fluorinated Polymer (A)

In the photocurable fluorinated polymer composition of the present invention, the fluorinated polymer (A) is a fluorinated polymer containing units (a-1) derived from a fluoroolefin and units (a-2) derived from an unsaturated monomer having an oxetanyl group or an unsubstituted oxetanyl group. Further, the fluorinated polymer (A) may contain units (a-3) derived from an ethylenically unsaturated monomer.

[Units (a-1)]

Units (a-1) are units derived from a fluoroolefin. The fluoroolefin is a compound having one or more hydrogen atoms of an unsaturated hydrocarbon compound substituted by fluorine atoms and is a polymerizable compound wherein some or all of the rest of hydrogen atoms may be substituted by chlorine atoms. Among hydrogen atoms, the number of hydrogen atoms substituted by fluorine atoms (hereinafter referred to as "fluorine addition number" is preferably at least 2, more preferably from 3 to 6, further preferably 3 or 4. If the fluorine addition number is 2 or more, the weather resistance of the coating film becomes sufficient.

The fluoroolefin is preferably a $C_{2-3}$ fluoroolefin such as tetrafluoroethylene, chlorotrifluoroethylene, hexafluoropropylene, vinylidene fluoride or vinyl fluoride. From the viewpoint of the weather resistance and the solvent resistance of the coating film, tetrafluoroethylene (hereinafter referred to as "TFE") or chlorotrifluoroethylene (hereinafter referred to as "CTFE") is more preferred.

The units (a-1) contained in the fluorinated polymer (A) may be one type only or two or more types in combination.

[Units (a-2)]

Units (a-2) are units derived from an unsaturated monomer having an oxetanyl group or a substituted oxetanyl group.

The substituted oxetanyl group is an oxetanyl group having a substituent (an atom other than a hydrogen atom, or a group of atoms) bonded to at least one carbon atom among carbon atoms contained in the oxetane ring of an oxetanyl group (hereinafter, in this specification, "substituted oxetanyl group" has the same meaning). As such a substituted oxetanyl group, an oxetanyl group having a substituent at the 3-position of the oxetane ring is preferred. Further, as the substituent, a $C_{1-6}$ alkyl group which may have an etheric oxygen atom is preferred.

The unsaturated monomer having an oxetanyl group or a substituted oxetanyl group may, for example, be a vinyl ether containing an oxetanyl group or a substituted oxetanyl group, an allyl ether containing an oxetanyl group or a substituted oxetanyl group, an isopropenyl ether containing an oxetanyl group or a substituted oxetanyl group, or a (meth)acrylic acid ester containing an oxetanyl group or a substituted oxetanyl group.

As the unsaturated monomer having an oxetanyl group or a substituted oxetanyl group to form units (a-2), an unsaturated monomer represented by the following formula (1) is preferred.

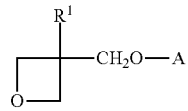

(in the formula (1), $R^1$ is a hydrogen atom or a $C_{1-6}$ alkyl group which may have an etheric oxygen atom, and A is a group selected from a vinyl group, an allyl group, an isopropenyl group and a (meth)acryloyl group).

$R^1$ in the unsaturated monomer represented by the formula (1) is preferably a $C_{1-4}$ alkyl group which may have an etheric oxygen atom, more preferably a $C_{1-4}$ alkyl group.

Specifically, 3-ethyl-3-vinyloxymethyloxetane, 3-ethyl-3-(4-vinyloxycyclohexyloxymethyl)oxetane, 3-ethyl-3-allyloxymethyloxetane, 3-methacryloxymethyl-3-ethyloxetane or 3-acryloyloxymethyl-3-ethyloxetane may, for example, be preferred. From the viewpoint of availability and mutual copolymerizability with a fluoroolefin, 3-ethyl-3-vinyloxymethyloxetane is more preferred. Units (a-2) contained in the fluorinated polymer (A) may be one type alone or two or more types in combination.

[Contents of Units (a-1) and Units (a-2) in Fluorinated Polymer (A)]

In the fluorinated polymer (A), the proportion of units (a-1) is preferably from 30 to 70 mol %, more preferably from 40 to 60 mol %, to the total number of moles of units (a-1) and units (a-2). When the proportion of units (a-1) is at least 30 mol %, a cured resin having excellent weather resistance can be obtained, and when it is at most 70 mol %, the compatibility with the photoreaction initiator (B) will be good, and it is possible to obtain a uniform and colorless transparent photocurable fluorinated polymer composition.

The proportion of units (a-2) in the fluorinated polymer (A) is preferably from 30 to 70 mol %, more preferably from 40 to 60 mol %, to the total number of moles of units (a-1) and units (a-2). When the proportion of units (a-2) is at least 30 mol %, the curing rate of the photocurable fluorinated polymer composition becomes high, and when it is at most 70 mol %, it is possible to obtain a photocurable fluorinated polymer composition having good storage stability.

The fluorinated polymer (A) may contain units other than units (a-1) and units (a-2). Such units other than units (a-1) and units (a-2) are preferably units derived from an unsaturated polymer copolymerizable with the fluoroolefin and with the unsaturated monomer having an oxetanyl group or a substituted oxetanyl group. Specifically, they are preferably units (a-3) derived from at least one unsaturated monomer which does not have a fluorine atom, an oxetanyl group and a substituted oxetanyl group and which has at least one group selected from the group consisting of an alkenyloxy group, a vinyloxy carbonyl group and a (meth)acryloyloxy group. Further, as the case requires, other units other than units (a-3) may be contained as the case requires.

[Units (a-3)]

Units (a-3) are preferably polymerized units derived from an unsaturated monomer which does not have a fluorine atom, an oxetanyl group and a substituted oxetanyl group and which has at least one group selected from the group consisting of an alkenyl group, an alkenyloxy group, a vinyloxy carbonyl group and a (meth)acryloyloxy group.

The alkenyl group is preferably a vinyl group.

The alkenyloxy group is preferably a vinyloxy group, an allyloxy group or an isopropenyloxy group.

The unsaturated monomer having a vinyloxy group is preferably a vinyl ether, such as a chain alkyl vinyl ether having a $C_{1-10}$ alkyl group, such as ethyl vinyl ether, n-propyl-vinyl ether, isopropyl vinyl ether, n-butyl vinyl ether, isobutyl vinyl ether, t-butyl vinyl ether, n-hexyl vinyl ether, n-octyl vinyl ether or 2-ethylhexyl vinyl ether; a cyclic alkyl vinyl ether having a $C_{4-10}$ cycloalkyl group, such as cyclohexyl vinyl ether, cyclopentyl vinyl ether or cyclooctyl vinyl ether; or an a-unsaturated cyclic ether such as 2,3-dihydrofuran, 4-methyl-2,3-dihydrofuran or 3,4-dihydro-2H-pyran.

The unsaturated monomer having an allyloxy group is preferably an allyl ether such as methyl allyl ether, ethyl allyl ether, isopropyl allyl ether, n-butyl allyl ether or isobutyl allyl ether.

The unsaturated monomer having an isopropenyloxy group is preferably an isobutylether such as methyl isopropenyl ether, ethyl isopropenyl ether, isopropyl isopropenyl ether, n-butyl isopropenyl ether or isobutyl isopropenyl ether.

The unsaturated monomer having an vinyloxy carbonyl group is preferably a vinyl ester such as vinyl acetate, vinyl propionate, vinyl butyrate, vinyl isobutyrate, vinyl caproate, vinyl isocaproate, vinyl pivalate, vinyl caprate, vinyl stearate, vinyl benzoate, vinyl versatate or vinyl laurate.

The unsaturated monomer having a (meth)acryloyloxy group is preferably a (meth)acrylic acid ester such as methyl (meth)acrylate, ethyl(meth)acrylate, propyl (meth)acrylate, isopropyl(meth)acrylate, butyl(meth)acrylate, hexyl(meth)acrylate, octyl(meth)acrylate or allyl(meth)acrylate.

Among the above, units (a-3) are preferably polymerized units (a-3a) having a $C_{1-10}$ alkyl group and not having a crosslinkable functional group, with a view to improving abrasion resistance or chipping resistance of the coating film containing the cured resin.

The number of carbon atoms in the alkyl group in units (a-3a) is preferably from 1 to 10, more preferably from 2 to 10, most preferably from 2 to 8. As a specific alkyl group, an ethyl group, a cyclohexyl group or a 2-ethylhexyl group is preferred.

Among them, the unsaturated monomer to form units (a-3a) is preferably ethyl vinyl ether, cyclohexyl vinyl ether or 2-ethylhexyl vinyl ether.

Further, with a view to improving the toughness, solvent resistance, etc. of the coating film containing the cured resin, units (a-3) preferably have a crosslinkable functional group. The crosslinkable functional group is preferably a functional group such as a hydroxy group, an alkoxysilyl group, an epoxy group, a carboxy group, an isocyanate group, an amino group or an amido group.

The unsaturated monomer having a hydroxy group is preferably a hydroxyalkyl vinyl ether such as hydroxyethyl vinyl ether, hydroxybutyl vinyl ether or cyclohexanedimethanol monovinyl ether; an ethylene glycol monovinyl ether such as diethylene glycol monovinyl ether, triethylene glycol monovinyl ether or tetraethylene glycol monovinyl ether; a hydroxyalkyl allyl ether such as hydroxyethyl allyl ether, hydroxybutyl allyl ether or cyclohexanedimethanol monoallyl ether; a hydroxyalkyl vinyl ester such as hydroxyethyl carboxylic acid vinyl ester, hydroxybutylcarboxylic acid vinyl ester or ((hydroxymethylcyclohexyl)methoxy) acetic acid vinyl ester; a hydroxyalkylcarboxylic acid allyl ester such as hyroxylethylcarboxylic acid allyl ester, hydroxybutyl carboxylic acid allyl ester or ((hydroxymethylcyclohexyl)methoxy)acetic acid allyl ester; or a (meth) acrylic acid hydroxyalkyl ester such as hydroxyethyl (meth) acrylate.

The unsaturated monomer having an alkoxysilyl group is preferably e.g. 3-(meth)acryloyloxypropyltrimethoxysilane, 3-(meth)acryloyloxypropylmethyldimethoxysilane or trimethoxysilylpropyl vinyl ether.

The unsaturated monomer having a carboxy group is preferably e.g. (meth)acrylic acid, itaconic acid, fumaric acid, maleic acid, maleic anhydride, citraconic acid or undecylenic acid.

The unsaturated monomer having an amino group is preferably e.g. amino propyl vinyl ether or diethylamino ethyl vinyl ether.

The unsaturated monomer having an isocyanate group is preferably e.g. 2-isocyanate ethyl(meth)acrylate or 1,1-bis (acryloylmethyl)ethyl isocyanate.

The unsaturated monomer having an epoxy group is preferably e.g. glycidyl vinyl ether, glycidyl carboxylic acid vinyl ester, glycidyl allyl ether or glycidyl(meth)acrylate.

Further, the fluorinated polymer (A) of the present invention preferably also contains polymerized units derived from a phosphorus atom-containing unsaturated monomer such as vinyl phosphoric acid or vinyl phosphoric acid dimethyl ester. By containing polymerized units derived from such a phosphorus atom-containing unsaturated monomer, the fluorinated polymer (A) or the cured resin becomes hardly inflammable.

In a case where units (a-3) are contained in the fluorinated polymer (A), the proportion of units (a-3) to all polymerized units in the fluorinated polymer (A) is preferably from 5 to 45 mol %, more preferably from 10 to 40 mol %. When the proportion of units (a-3) is within this range, the weather resistance of a coating film containing the cured resin can sufficiently be secured.

Units (a-3) contained in the fluorinated polymer (A) may be one type only or two or more types in combination. Or, they may be a combination of at least one type of units (a-3a) and at least one type of units (a-3b).

[Other Units]

The fluorinated polymer (A) may contain units other than the above units (a-1), (a-2) and (a-3) (hereinafter referred to as "other units").

A monomer to constitute such other units is not particularly limited so long as it is a monomer other than for units (a-1), (a-2) and (a-3), but it is preferably a monomer which has no fluorine atom, oxetanyl group or substituted oxetanyl group.

The monomer for such other units may, for example, be an alkenyl ether such as 1-methoxy-2-methylpropene, 1-ethoxyl-2-methylpropene, 1-methoxy-2-methylbutene, 2-methoxy-2-butene or 2-methoxy-3-methyl-2-butene; an olefin such as ethylene, propylene, isobutene, butene or styrene; an acrylamide such 1-vinyl imidazole, (meth)acrylamide, N,N-dimethyl(meth)acrylamide, N,N-diethyl(meth) acrylamide, N-hydroxyethyl acrylamide or 1-vinyl-2-pyrrolidone; or a vinylsilane such as a vinyl trimethoxysilane or vinyl methyldiethoxysilane.

In a case where other units are contained in the fluorinated polymer (A), the proportion of such other units to all polymerized units in the fluorinated polymer (A) is preferably from 0 to 5 mol %.

The proportion of other units being 0 mol % means that other units are not contained. The lower limit in a case where other units are contained, is more than 0 mol %, preferably 0.01 mol %.

Other units contained in the fluorinated polymer (A) may be one type only or two or more types in combination.

[Fluorine Content in Fluorinated Polymer (A)]

The fluorine content in the fluorinated polymer (A) is preferably at least 10 mass %, more preferably at least 20 mass %, further preferably at least 25 mass %. The larger the fluorine content, the better the weather resistance of the coating film containing the cured resin.

On the other hand, the fluorine content in the fluorinated polymer (A) is preferably at most 35 mass %. When the fluorine content is within this range, it is possible to obtain a uniform colorless transparent photocurable fluorinated polymer composition having good compatibility with the photoreaction initiator (B).

[Polymerization Method for Fluorinated Polymer (A)]

The polymerization method for the fluorinated polymer (A) may be carried out by a known method. For example, a usual radical polymerization method may be employed, and as other polymerization methods, solution polymerization, suspension polymerization, emulsion polymerization, etc. may be employed.

For the polymerization reaction, an organic solvent may be used for the purpose of making the reaction system to be uniform thereby to facilitate the reaction. The organic solvent to be employed for the polymerization reaction may, for example, be preferably an aromatic hydrocarbon such as benzene, toluene, xylene, ethylbenzene, aromatic petroleum naphtha, tetralin, turpentine oil, Solvesso #100 (registered trademark, Exxon Mobil Corporation), or Solvesso #150 (registered trademark, Exxon Mobil Corporation); an alcohol such as ethanol, butanol or propanol; an ether such as tetrahydrofuran or cyclopentyl methyl ether; an ester or ether ester, such as methyl acetate, ethyl acetate, n-propyl acetate, isopropyl acetate, n-butyl acetate, isobutyl acetate, secondary butyl acetate, amide acetate, propylene glycol monomethyl ether or methoxy butyl acetate; a ketone such as acetone, methyl ethyl ketone, diisobutyl ketone, diethyl ketone, methyl propyl ketone, diisopropyl ketone, methylamylohexanone, isophorone, mesityl oxide, methyl isoamyl ketone, ethyl n-butyl ketone or ethyl amyl ketone; further, an aprotic polar solvent such as dimethylsulfoxide or N,N-dimethylformamide; or a glycol derivative such as triethylene glycol monomethyl ether, diethylene glycol monomethyl ether, diethylene glycol monobutyl ether, diethylene glycol monohexyl ether, propylene glycol monomethyl ether acetate, ethylene glycol monophenyl ether, diethylene glycol monophenyl ether, dipropylene glycol, diethylene glycol-2-ethylhexyl ether or tetraethylene glycol dimethyl ether.

One of such organic solvents may be used alone or two or more of them may be used in combination. The amount of such an organic solvent is not particularly limited, but it is usually preferably used in an amount of from 5 to 95 parts by weight, more preferably from 20 to 80 parts by weight, per 100 parts by weight of the materials for reaction.

The reaction temperature for the polymerization may suitably be changed depending upon the polymerization initiator. In the case of radical polymerization, it is usually preferably from 0 to 130° C. The reaction time is preferably from about 1 to 50 hours.

The radical polymerization initiator may, for example, be preferably a ketone peroxide such as methyl ethyl ketone peroxide, cyclohexanone peroxide, 3,3,5-trimethylcyclohexanone peroxide, methylcyclohexanone peroxide, methylacetoacetate peroxide or acetylacetone peroxide; a peroxyketal such as 1,1-bis(t-butylperoxy)-3,3,5-trimethylcyclohexane, 1,1-bis(t-butylperoxy)-cyclohexane, 2,2-bis(t-butylperoxy)octane, n-butyl-4,4-bis(t-butylperoxy) valerate or 2,2-bis(t-butylperoxy)butane; a hydroperoxide such as t-butyl hydroperoxide, cumene hydroperoxide, diisopropylbenzene peroxide, p-mentane hydroperoxide, 2,5-dimethylhexane-2,5-dihydroperoxide or 1,1,3,3-tetramethylbutyl hydroperoxide; a dialkyl peroxide such as di-t-butyl peroxide, t-butylcumyl peroxide, dicumyl peroxide, α,α'-bis(t-butylperoxy-m-isopropyl)benzene, 2,5-dimethyl-2,5-di(t-butylperoxy)hexane, or 2,5-dimethyl-2,5-di(t-butylperoxy)hexane; a diacyl peroxide such as acetyl peroxide, isobutyl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide or m-toluoyl peroxide; a peroxy dicarbonate such as diisopropyl peroxy dicarbonate, di-2-ethylhexyl peroxy dicarbonate, di-n-propyl peroxy dicarbonate, bis-(4-t-butylcyclohexyl)peroxy dicarbonate, di-myristyl peroxy dicarbonate, di-2-ethoxyethyl peroxy dicarbonate, dimethoxyisopropyl peroxy dicarbonate, di-(3-methyl-3-methoxybutyl) peroxy dicarbonate or diallyl peroxy dicarbonate; a peroxyester such as t-butylperoxy acetate, t-butylperoxy isobutyrate, t-butylperoxy pivalate, t-butylperoxy neodecanoate, cumylperoxy neodecanoate, t-butylperoxy-2-ethyl hexanoate, t-butylperoxy-3,5,5-trimethyl hexanoate, t-butylperoxy laurate, t-butylperoxy benzoate, di-t-butylperoxy isophthalate, 2,5-dimethyl-2,5-di(benzoylperoxy)hexane, t-butylperoxy maleate, cumylperoxy neodecanoate, t-hexylperoxy pivalate, t-butylperoxy neodecanoate, t-hexyperoxy neodecanoate, cumylperoxy neohexanoate, acetylcyclohexylsulfonyl peroxide or 3,3',4,4'-tetra(t-butylperoxycarbonyl)benzophenone; a peroxy carbonate ester such as t-butylperoxyisopropyl carbonate, t-butylperoxyallyl carbonate, t-hexylperoxy-n-butyl carbonate or t-butylperoxy-n-propyl carbonate; or an azo compound such as 2,2'-azobis(4-methoxy-2,4-dimethylvaleronitrile), 2,2'-azobis(2,4-dimethylvaleronitrile), 2,2'-azobis(2-methylpropionitrile), 2,2'-azobis(2-methylbutyronitrile), 1,1'-azobis(cyclohexane-1-carbonitrile), 2-(carbamoylazo) isobutyronitrile, 2,2'-azobis{2-methyl-N-[1,1-bis(hydroxymethyl)-2-hydroxyethyl]propionamide}, 2,2'-azobis{2-methyl-N-[2-(1-hydroxybutyl)]-propionamide}, 2,2'-azobis[2-methyl-N-(2-hydroxyethyl)-propionamide], 2,2'-azobis[N-(2-propenyl)-2-methylpropionamide], 2,2'-azobis(N-butyl-2-methylpropionamide), 2,2'-azobis(N-cyclohexyl-2-methylpropionamide), 2,2'-azobis[2-(5-methyl-2-imidazolin-2-yl)propane]dihydrochloride, 2,2'-azobis[2-(2-imidazolin-2-yl)propane]disulfate dihydrate, 2,2'-azobis [2-(3,4,5,6-tetrahydropyridin-2-yl)propane] dihydrochloride, 2,2'-azobis(2-[1-(2-hydroxyethyl)-2-imidazolin-2-yl]propane)dihydrochloride, 2,2'-azobis[2-(2-imidazolin-2-yl)propane, 2,2'-azobis(2-methylpropionamidine)dihydrochloride, 2,2'-azobis[N-(2-carboxyethyl)-2-methyl-propionamidine], 2,2'-azobis(2-methylpropionamidoxime), dimethyl-2,2'-azobis(2-methylpropionate), 4,4'-azobis(4-cyanovaleric acid) or 2,2'-azobis(2,4,4-trimethylpentane).

One of such polymerization initiators may be used alone or two or more of them may be used in combination.

In the case of emulsion polymerization, the polymerization reaction can be carried out in water in the presence of an anionic or nonionic emulsifier by using an initiator such as a water-soluble peroxide, a persulfate or a water-soluble azo compound.

During the polymerization reaction, a very small amount of hydrochloric acid or hydrofluoric acid may sometimes be formed, and it is preferred to remove it by a buffer after the polymerization reaction.

The fluorinated polymer (A) preferably has a number average molecular weight (Mn) of from 5,000 to 20,000 as measured by gel permeation chromatography (GPC) by using polystyrene as the standard substance. When Mn is at least 5,000, the weather resistance of a coating film containing the cured resin will be good. Further, when Mn exceeds 20,000, the viscosity tends to be high, and a large amount of diluting solvent will be required at the time of forming the photocurable fluorinated polymer composition into the coating material (at the time of adjusting the viscosity), such being undesirable from the viewpoint of an environmental load.

2. Photoreaction Initiator (B)

The photocurable fluorinated polymer composition of the present invention comprises the above-described fluorinated polymer (A) and a photoreaction initiator (B).

The photoreaction initiator (B) is preferably a photoreaction initiator which generates cations by ultraviolet rays thereby to initiate the curing reaction. As such a photoreaction initiator, a known sulfonium salt, iodonium salt, phosphonium salt, diazonium salt, ammonium salt or ferrocene is preferred.

Now, specific examples will be given, but the photoreaction initiator is not limited to such compounds.

The photoreaction initiator of a sulfonium salt type may, for example, be bis[4-(diphenylsulfonio)phenyl]sulfide bishexafluoro phosphate, bis[4-(diphenylsulfonio)phenyl] sulfide bishexafluoro antimonate, bis[4-(diphenylsulfonio) phenyl]sulfide bistetrafluoro borate, bis[4-(diphenylsulfonio)phenyl]sulfide tetrakis(pentafluorophenyl) borate, diphenyl-4-(phenylthio)phenylsulfonium hexafluoro phosphate, diphenyl-4-(phenylthio)phenylsulfonium hexafluoro antimonate, diphenyl-4-(phenylthio)phenylsulfonium tetrafluoroborate, diphenyl-4-(phenylthio)phenylsulfonium tetrakis(pentafluorophenyl) borate, triphenylsulfonium hexafluorophosphate, triphenylsulfonium hexafluoroantimonate, triphenylsulfonium tetrafluoroborate, triphenylsulfonium tetrakis(pentafluorophenyl)borate, bis[4-(di(4-(2-hydroxyethoxy))phenylsulfonio)phenyl]sulfide bishexafluorophosphate, bis[4-(di(4-(2-hydroxyethoxy))phenylsulfonio)phenyl]sulfide bishexafluoroantimonate, bis[4-(di(4-(2-hydroxyethoxy))phenylsulfonio)phenyl]sulfide bistetrafluoroborate, or bis[4-(di(4-(2-hydroxyethoxy))phenylsulfonio)phenyl]sulfide tetrakis(pentafluorophenyl)borate.

The photoreaction initiator of an iodonium salt type may, for example, be preferably diphenyl iodonium hexafluorophosphate, diphenyl iodonium hexafluoroantimonate, diphenyl iodonium tetrafluoroborate, diphenyl iodonium tetrakis (pentafluorophenyl)borate, bis(dodecylphenyl)iodonium hexafluorophosphate, bis(dodecylphenyl)iodonium hexafluoroantimonate, bis(dodecylphenyl)iodonium tetrafluoroborate, bis(dodecylphenyl)iodonium tetrakis(pentafluorophenyl)borate, 4-methylphenyl-4-(1-methylethyl)phenyl iodonium hexafluorophosphate, 4-methylphenyl-4-(1-methylethyl)phenyl iodonium hexafluoroantimonate, 4-methylphenyl-4-(1-methylethyl)phenyl iodonium tetrafluoroborate, or 4-methylphenyl-4-(1-methylethyl)phenyl iodonium tetrakis(pentafluorophenyl)borate.

The photoreaction initiator of a phosphonium salt type may, for example, be preferably ethyltriphenylphosphonium tetrafluoroborate, ethyltriphenylphosphonium hexafluorophosphate, ethyltriphenylphosphonium hexafluoroantimonate, tetrabutylphosphonium tetrafluoroborate, tetrabutylphosphonium hexafluorophosphate, or tetrabutylphosphonium hexafluoroantimonate.

The photoreaction initiator of a diazonium salt type may, for example, be preferably phenyl diazonium hexafluorophosphate, phenyl diazonium hexafluoroantimonate, phenyl diazonium tetrafluoroborate, or phenyl diazonium tetrakis (pentafluorophenyl)borate.

The photoreaction initiator of an ammonium salt type may, for example, be preferably 1-benzyl-2-cyanopyridinium hexafluorophosphate, 1-benzyl-2-cyanopyridinium hexafluoroantimonate, 1-benzyl-2-cyanopyridinium tetrafluoroborate, 1-benzyl-2-cyanopyridinium tetrakis(pentafluorophenyl)borate, 1-(naphthylmethyl)-2-cyanopyridinium hexafluorophosphate, 1-(naphthylmethyl)-2-cyanopyridinium hexafluoroantimonate, 1-(naphthylmethyl)-2-cyanopyridinium tetrafluoroborate, or 1-(naphthylmethyl)-2-cyanopyridinium tetrakis(pentafluorophenyl)borate.

The photoreaction initiator of a ferrocene type may, for example, be preferably (2,4-cyclopentadien-1-yl)[(1-methylethyl)benzene]-Fe(II) hexafluorophosphate, 2,4-cyclopentadien-1-yl)[(1-methylethyl)benzene]-Fe(II) hexafluoroantimonate, (2,4-cyclopentadien-1-yl)[(1-methylethyl) benzene]-Fe(II)tetrafluoroborate, or (2,4-cyclopentadien-1-yl)[(1-methylethyl)benzene]-Fe(II)tetrakis (pentafluorophenyl)borate.

Commercial products of such photoreaction initiators may, for example, be "SP-150", "SP-152", "SP-170", "SP-172", "CP-66", "CP-77", tradenames, manufactured by Asahi Denka Co., Ltd.; "CYRACURE-UVI-6990", "CYRACURE-UVI-68743", "CYRACURE-UVI-6992", tradenames, manufactured by Union Carbide Corporation; "CI-2855", "CI-2639", "CI-2758", tradenames, manufactured by Nippon Soda Co., Ltd.; "San-Aid SI-60", "San-Aid SI-80", "San-Aid SI-100", tradenames, manufactured by Sanshin Chemical Industry Co., Ltd., "IRGACURE 261", "IRGACURE 250", tradenames, manufactured by Ciba Specialty Chemicals; "RHODORSIL 2074", tradename, manufactured by Rhodia Japan; "Bis(4-t-butylphenyl)iodonium hexafluorophosphate", tradename, manufactured by Midori Kagaku Co., Ltd.; "CPI-100P", "CPI-101A", "CPI-200K", tradenames, manufactured by San-Apro Ltd.; "ESACURE-1064", "ESACURE-1187", tradenames, manufactured by Lamberti; and "KAYACURE-PCT-220", tradename, manufactured by Nippon Kayaku Co., Ltd.

As the photoreaction initiator, a sulfonium salt of iodonium salt type initiator is preferred from the viewpoint of the curing rate, stability and economical efficiency. As a commercial product, "IRGACURE 250", tradename, manufactured by Chiba Specialty Chemicals; or "CPI-100P", "CPI-101A" or "CPI-200K", tradenames, manufactured by San-Apro Ltd., is preferred.

One of such photocurable initiators (B) may be used alone, or two or more of them may be used in combination.

A preferred range of the amount of the photoreaction initiator to be used is not particularly limited, but the amount is preferably from 0.05 to 25 parts by mass, more preferably from 1 to 20 parts by mass, per 100 parts by mass of the fluorinated polymer (A), or when the after-mentioned compound (C) is used in combination, per 100 parts by mass of the total amount of (A) and (C). When the amount is at least 0.05 part by mass, the sensitivity of the photoreaction initiator can sufficiently be secured, and with a small light irradiation energy, curing of the photocurable fluorinated polymer composition can be sufficiently proceeded in a short time. Further, when the amount is at most 25 parts by mass, the sensitivity of the photoreaction initiator can be sufficiently secured, and it is possible to avoid using the photoreaction initiator excessively so that the photoreaction initiator will remain as a non-cured component in the composition thereby to deteriorate the physical properties of the cured resin. Further, the amount of the photoreaction initiator to be used may be small, such being economically preferred.

3. Compound (C)

The photocurable fluorinated polymer composition of the present invention comprises the above fluorinated polymer (A) and the photoreaction initiator (B), but it preferably further contains a compound (C) having at least one reactive functional group, in one molecule, which forms a chemical bond by a photocation curing reaction with the oxetanyl group or substituted oxetanyl group in the fluorinated polymer (A), for the propose of adjusting the mechanical or physical properties of the coating film containing the cured resin.

Such a reactive functional group is not particularly limited so long as it has a nature to react with the oxetanyl group in the fluorinated polymer (A), but it may, for example, be preferably an epoxy group, an oxetanyl group, a vinyl ether group, a vinyl thioether group or a cyclic carbonate group, more preferably an epoxy group or an oxetane group.

The compound (C) may have one or more of such reactive functional groups.

Further, the compound (C) to be incorporated to the photocurable fluorinated polymer composition may be one type only or two or more types in combination.

Now, specific examples will be given, but the compound (C) is by no means limited to such compounds.

[Compound (c-1) Having One Epoxy Group in One Molecule]

The compound (c-1) having one epoxy group in one molecule may, for example, be preferably a bisphenol A-type epoxy resin, a hydrogenated bisphenol A-type epoxy resin, a bisphenol F-type epoxy resin, a hydrogenated bisphenol F-type epoxy resin, a novolac type epoxy resin, a hydrogenated novolac type epoxy resin, a biphenyl type epoxy resin, a naphthalene type epoxy resin, an alicyclic epoxy resin, a triphenolmethane type epoxy resin, a dicyclopentadiene type epoxy resin, a terpene type epoxy resin, a bisallyl fluorene type epoxy resin, an epoxy group-containing organopolysiloxane or an epoxy group-containing polymer, from the viewpoint of the resin strength during the curing, adhesion, etc.

Specifically, the bisphenol A-type epoxy resin may, for example, be "EPIKOTE 828", "EPIKOTE 1001", "EPIKOTE 1002" or "EPIKOTE 1004", tradename, manufactured by Japan Epoxy Resins. The hydrogenated bisphenol A-type epoxy resin may, for example, be "EPIKOTE YX-8000" or "EPIKOTE YX-8034", tradename, manufactured by Japan Epoxy Resins. The bisphenol F-type epoxy resin may, for example, be "EPIKOTE 806", "EPIKOTE 807", "EPIKOTE 4004P" or "EPIKOTE 4007P", manufactured by Japan Epoxy Resins. The hydrogenated bisphenol F-type epoxy resin may, for example, be "EPIKOTE YL-6834", tradename, manufactured by Japan Epoxy Resins. The novolac type epoxy resin may, for example, be "Epotohto TDCN-701" or "Epotohto YDPN-638", tradename, manufactured by Tohto Kasei Co., Ltd., or "EPIKOTE 154", tradename, manufactured by Japan Epoxy Resins. The biphenyl type epoxy resin may, for example, be "EPIKOTE YX-4000" or "EPIKOTE YX-4000H", tradename, manufactured by Japan Epoxy Resins. The naphthalene type epoxy resin may, for example, be "EPICRON HP-4032" or "EPICRON EXA-4700", tradename, manufactured by Dainippon Ink and Chemicals, or "ESN-165", "ESN-175", "ESN-185", "ESN-195", "ESN-355" or "ESN-375", tradename, manufactured by Nippon Steel Chemical Co., Ltd. The alicyclic epoxy resin may, for example, be "CELLOXIDE 2021P", tradename, manufactured by Daicel Chemical Industries Ltd. The dicyclopentadiene type epoxy resin may, for example, be "EPICRON HP-7200L", "EPICRON HP-7200", "EPICRON HP-7200H" or "EPICRON HP-7200HH", tradename, manufactured by Dainippon Ink and Chemicals. The triphenolmethane type epoxy resin may, for example, be "EPPN-501H" or "EPPN-502H", tradename, manufactured by Nippon Kayaku Co., Ltd. The bisallyl fluorene type epoxy resin may, for example, be "OGSOL PC", "OGSOL PG-100", "OGSOL EP" or "OGSOL EG-210", tradename, manufactured by Osaka Gas Chemicals Co., Ltd. The epoxy group-containing organopolysiloxane may, for example, be "KF-101", "KF-102", "KF-105", "X-22-169AS" or "X-22-9002", tradename, manufactured by Shin-Etsu Chemical Co., Ltd.

The epoxy group-containing polymer is a polymer having polymerized units derived from a monomer containing an ethylenically unsaturated bond and an epoxy group (hereinafter referred to as an epoxy group-containing unsaturated monomer).

The epoxy group-containing unsaturated monomer may, for example, be preferably glycidyl methacrylate, glycidyl acrylate or 3,4-epoxy cyclohexylmethyl methacrylate.

The epoxy group-containing polymer can be obtained by polymerizing an epoxy group-containing unsaturated monomer alone, or by copolymerizing an epoxy group-containing unsaturated monomer with another unsaturated monomer. The molecular structure of such an epoxy group-containing polymer may have a linear or branched structure. Further, such an epoxy group-containing polymer may be any one of a random copolymer, a block copolymer and a graft copolymer.

The polymerization method for the epoxy group-containing polymer may be carried out by a known method. That is, the polymerization method is not particularly limited, and a polymerization method such as radical polymerization or ion polymerization may be employed. More specifically, a polymerization method such as a bulk polymerization method, a solution polymerization method, a suspension polymerization method or an emulsion polymerization method may be employed in the presence of a polymerization initiator. Depending upon the polymerization method, a monomer may remain in a large amount, and if such a monomer presents an influence over application of a coating material containing the photocurable fluorinated polymer composition or over the physical properties of the coating film containing the cured resin after the curing, it is preferred to remove such a monomer by a reduced pressure distillation method or by a reprecipitation method.

The weight average molecular weight (Mw) of the epoxy group-containing polymer is preferably from 3,000 to 100,000, more preferably from 5,000 to 20,000. When the weight average molecular weight (Mw) is at least 3,000, the hardness of the coating film containing the cured resin will be sufficient, and when it is at most 100,000, the planarity of the coating film containing the cured resin will be good. Here, the weight average molecular weight (Mw) of the epoxy group-containing polymer is a weight average molecular weight as calculated by polystyrene by a gel permeation chromatography (GPC) method.

[Compound (c-2) Having at Least One Oxetanyl Group in One Molecule]

As the compound (c-2) having at least one oxetanyl group in one molecule, a compound having an oxetanyl group or a substituted oxetanyl group and not having a fluorine atom is preferred, and it is more preferred to use a compound represented by the formula (2), (3) or (4) and having no fluorine atom, and a polymer having polymerized units (a-2) derived from an unsaturated monomer having an oxetanyl group or a substituted oxetanyl group, and having no fluorine atom.

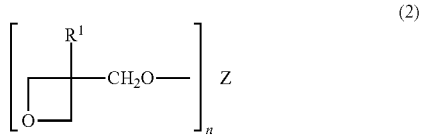

(In the formula (2), $R^1$ is a hydrogen atom or a $C_{1-6}$ alkyl group which may have an etheric oxygen atom, Z is an n-valent hydrocarbon group which may have a substituent, and n is an integer of from 1 to 4.)

In the compound represented by the formula (2), $R^1$ is preferably a $C_{1-4}$ alkyl group which may have an etheric oxygen atom, more preferably a $C_{1-4}$ alkyl group.

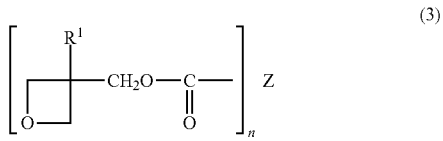

(In the formula (3), $R^1$ is a hydrogen atom or a $C_{1-6}$ alkyl group which may have an etheric oxygen atom, Z is an n-valent hydrocarbon group which may have a substituent, and n is an integer of from 1 to 4.)

In the compound represented by the formula (3), $R^1$ is preferably a $C_{1-4}$ alkyl group which may have an etheric oxygen atom, more preferably a $C_{1-4}$ alkyl group.

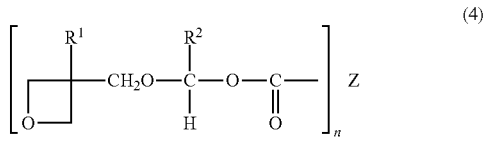

(In the formula (4), $R^1$ is a hydrogen atom or a $C_{1-6}$ alkyl group which may have an etheric oxygen atom, $R^2$ is a $C_{1-6}$ linear or branched alkyl group which may have an etheric oxygen atom, Z is an n-valent hydrocarbon group which may have a substituent, and n is an integer of from 1 to 4.)

In the compound represented by the formula (4), $R^1$ is preferably a $C_{1-4}$ alkyl group which may have an etheric oxygen atom, more preferably a $C_{1-4}$ alkyl group. $R^2$ is preferably a $C_{1-4}$ linear or branched alkyl group which may have an etheric oxygen atom, more preferably a $C_{1-4}$ linear or branched alkyl group.

The compound represented by the formula (2) may be produced by using a known reaction. For example, it may be obtained by etherification reaction of a hydroxy compound with a 3-alkyl-3-hydroxymethyloxetane.

Specifically, it may, for example, be a compound obtained by etheric condensation of a hydroxy compound such as an aliphatic monoalcohol having a $C_{1-6}$ alkyl group, an aliphatic glycol having a $C_{2-8}$ alkylene group, a $C_{2-18}$ aromatic alcohol, a phenol novolac resin or a polysiloxane having a polymerized unit of a quaternary structure and having a degree of polymerization of from 2 to 8, with an oxetane such as 3-ethyl-3-methoxymethyloxetane. More specifically, it may, for example, be 1,4-bis(((3-ethyl-3-oxetanyl)methoxy)methyl)benzene, 1,4-bis(((3-ethyl-3-oxetanyl)methoxy)methyl)benzene, 4,4'-bis(((3-ethyl-3-oxetanyl)methoxy)methyl)biphenyl, 3,3',5,5'-methyl-4,4'-bis((3-ethyl-3-oxetanyl)methoxy)methyl)biphenyl, 1,4-bis((3-ethyl-3-oxetanyl)methoxy)benzene, 4,4'-bis((3-ethyl-3-oxetanyl)methoxy)biphenyl or 3,3',5,5'-methyl-4,4'-bis((3-ethyl-3-oxetanyl)methyl)biphenyl.

The compound represented by the formula (3) may be produced by using a known reaction. For example, it may be obtained by an esterification reaction of a carboxy group with a 3-alkyl-3-hydroxymethyloxetane. Specifically, it may, for example, be a compound obtained by esterification of a carboxy compound such as adipic acid, terephthalic acid, cyclohexanedicarboxylic acid, trimellitic acid or pyromellitic acid, with an oxetane such as 3-ethyl-3-methoxymethyloxetane. More specifically, it may, for example, be bis((3-ethyl-3-oxetanyl)methyl)carbonate, bis((3-ethyl-3-oxetanyl)methyl)adipate, bis((3-ethyl-3-oxetanyl)methyl)benzene-1,4-dicarboxilate or bis((3-ethyl-3-oxetanyl)methyl)cyclohexane-1,4-dicarboxilate.

The compound represented by the formula (4) may be produced by using the method disclosed in JP-A-10-25406. For example, it may be obtained by a hemiacetal esterification reaction of a carboxy compound with a 3-alkyl-3-vinyloxymethyloxetane.

Specifically, it may, for example, be a compound obtained by hemiacetal esterification of a carboxy compound such as adipic acid, terephthalic acid, cyclohexanedicarboxylic acid, trimellitic acid or pyromellitic acid, with an oxetane such as 3-ethyl-3-vinyloxymethyloxetane.

The polymer having polymerized units (a-2) derived from an unsaturated monomer having an oxetanyl group or a substituted oxetanyl group and having no fluorine atom, is a polymer polymerized by using a monomer containing an ethylenic unsaturated bond or an oxetanyl group (hereinafter referred to as "an oxetanyl group-containing unsaturated monomer").

As the oxetanyl group-containing unsaturated monomer, 3-ethyl-3-methacryloylmethyl-oxetane may, for example, be preferred. Specifically, "ETERNACOLL OXMA", tradename, manufactured by Ube Industries, Ltd. may preferably be mentioned.

The oxetanyl group-containing polymer may be obtained by polymerizing the oxetanyl group-containing unsaturated monomer alone, or by copolymerizing the oxetanyl group-containing unsaturated monomer with another monomer. The molecular structure of such an oxetanyl group-containing polymer may have a linear or branched structure. Further, such an oxetanyl group-containing polymer may be any one of a random copolymer, a block copolymer and a graft copolymer.

The polymerization method for the oxetanyl group-containing polymer may be carried out by a known method. That is, the polymerization method is not particularly limited, and it is possible to employ a polymerization method such as radical polymerization or ion polymerization. More specifically, it is possible to employ a polymerization method such as a bulk polymerization method, a solution polymerization method, a suspension polymerization method or an emulsion polymerization method in the presence of a polymerization initiator. Depending upon the polymerization method, a monomer may remain in a large amount, and if such a remaining monomer gives an influence over application of the photocurable fluorinated polymer composition or over the physical properties of the coating film containing the cured resin after the curing, it is preferred to remove such a monomer by a reduced pressure distillation method or a reprecipitation method.

The weight average molecular weight (Mw) of the oxetanyl group-containing polymer is preferably from 3,000 to 100,000, more preferably from 5,000 to 20,000. When the weight average molecular weight (Mw) is at least 3,000, the hardness of the coating film containing the cured resin will be sufficient, and when it is at most 100,000, the planarity of the coating film containing the cured resin will be good. Here, the weight average molecular weight (Mw) of the oxetanyl group-containing polymer is a weight average molecular weight as calculated as polystyrene by a gel permeation chromatography (GPC) method.

As the compound (c-2) having at least one oxetanyl group in one molecule, 1,4-bis[(3-ethyl-3-oxetanylmethoxy)methyl]biphenyl is preferred from the viewpoint of the compatibility with the fluorinated polymer (A).

[Compound (c-3) Having at Least One Vinyl Ether Group in One Molecule]

The compound (c-3) having at least one vinyl ether group in one molecule may, for example, be a divinyl(thio)ether, a trivinyl(thio)ether, a tetravinyl(thio)ether, or a hexavinyl (thio)ether.

Specifically, it may, for example, be an aliphatic divinyl ether such as trimethylene glycol divinyl ether, 1,4-bisvinyloxymethylcyclohexane, ethylene glycol divinyl ether, diethylene glycol divinyl ether, triethylene glycol divinyl ether, tetraethylene glycol divinyl ether, polyethylene glycol divinyl ether, 1,4-butanediol divinyl ether, 1,5-pentanediol divinyl ether, 1,6-hexanediol divinyl ether, 1,9-nonanediol divinyl ether or 1,4-cyclohexanedimethanol divinyl ether; an aromatic divinyl ether such as 1,4-benzene divinyl ether, bisphenol A divinyl ether or bisphenol F divinyl ether; an aliphatic trivinyl ether, such as trimethylolethane trivinyl ether, trimethylolpropane trivinyl ether or glycerol trivinyl ether; an aliphatic tetravinyl ether such as pentaerythritol tetravinyl ether; an aliphatic hexavinyl ether such as dipentaerythritol hexavinyl ether; an aliphatic divinyl thioether corresponding thereto; an aromatic divinyl thioether; an aliphatic trivinyl thioether; an aliphatic tetravinyl thioether; or an aliphatic hexavinyl thioether.

Among them, an aliphatic divinyl ether is preferred from the viewpoint of the availability and economical efficiency.

[Other Components]

1. Photosensitizer

It is preferred to incorporate a photosensitizer to the photocurable fluorinated polymer composition of the present invention for the purpose of photocuring the composition in a short time under low energy irradiation. Further, incorporation of the photosensitizer is effective also in that in a case where a pigment, etc. are incorporated in the photocurable fluorinated polymer composition of the present invention whereby light is shielded by the pigment and light is not effectively transmitted to the interior of the coating film, it is possible to maintain the high curing rate even with a small quantity of light.

As such a photosensitizer, an anthracene compound, a pyrene compound, a carbonyl compound, an organic sulfur compound, a persulfate, a redox type compound, an azo or diazo compound, a halogen compound, a photo-reducing pigment, etc. may, for example, be mentioned. Two or more of them may be used in combination as a mixture.

The photosensitizer is usually preferably contained in such an amount that it will be within a range of from 0.01 to 10 parts by weight per 100 parts by weight of the photocurable fluorinated polymer composition of the present invention.

Specific photosensitizers may, for example, be preferably an anthracene compound; a pyrene compound, a benzoin derivative such as benzoin methyl ether, benzoin isopropyl ether or α,α-dimethoxy-α-phenylacetophenone; a benzophenone derivative such as benzophenone, 2,4-dichlorobenzophenone, methyl o-benzoyl benzoate, 4,4'-bis(dimethylamino)benzophenone or 4,4'-bis(diethylamino)benzophenone; a thioxanthone derivative such as 2-chlorothioxanthone or 2-isopropylthioxanthone; an anthraquinone derivative such as 2-chloroanthraquinone or 2-methylanthraquinone; an acridone derivative such as N-methylacridone or N-butylacridone; and others, such as α,α-diethoxyacetophenone, benzyl, fluorenone, xanthone, an uranyl compound, a halogen compound, etc.

In a case where as a pigment, a titanium oxide pigment is incorporated to the photocurable fluorinated polymer composition of the present invention, there may be a case where ultraviolet light (at most 380 mm) is absorbed by titanium oxide, whereby the coating film is likely to fail in curing. Therefore, in order to avoid such curing failure, it is preferred to use a photosensitizer having a sensitizing ability to light having a wavelength of longer than 380 nm. As such a photosensitizer having a sensitizing ability to light having a wavelength of longer than 380 nm, an anthracene compound is preferred.

Specifically, "ANTHRACURE UVS-1331", "ANTHRACURE UVS-1101", etc., tradenames, manufactured by Kawasaki Kasei Chemicals Ltd. may, for example, be mentioned.

2. Organic Solvent

To the photocurable fluorinated polymer composition of the present invention, an organic solvent may be incorporated depending upon its particular application, to lower the viscosity of the composition thereby to improve the coating performance or working efficiency at the time when the composition is made into a coating material. In a case where no adjustment of the viscosity is required, no organic solvent may be added, and the photocurable fluorinated polymer composition of the present invention may be used solventless without adding any organic solvent.

As a specific organic solvent, it is possible to use an organic solvent which is commonly used, for example, a ketone such as acetone, methyl ethyl ketone, methyl propyl ketone, ethyl butyl ketone, diisobutyl ketone, cyclohexanone or isophorone; an ester such as methyl acetate, ethyl acetate, n-propyl acetate, isopropyl acetate, n-butyl acetate, isobutyl acetate or t-butyl acetate; an aromatic hydrocarbon such as toluene, xylene, ethylbenzene, an aromatic petroleum naphtha, tetralin, turpentine oil, Solvesso #100 (registered trademark, Exxon Mobil Corporation), or Solvesso #150 (registered trademark, Exxon Mobil Corporation); an ether such as dioxane, tetrahydrofuran or cyclopentyl methyl ether; an ether ester such as propylene glycol monomethyl ether acetate or methoxybutyl acetate; or an aprotic polar solvent such as dimethyl sulfoxide or N,N-dimethylformamide.

With a view to reducing the environmental load, a solvent which satisfies PRTR Law and HAPs Regulations, i.e. an organic solvent containing no aromatic compound is preferred. Further, an organic solvent classified in the third class organic solvents in the classification of organic solvents by Industrial Safety and Health Act is also preferred.

Specifically, it is preferred to use an ester type solvent or ketone type solvent not violating PRTR Law or HAPs Regulations; or a paraffin type solvent or naphthene type solvent classified in the third class organic solvents.

In a case where a paraffin type solvent or naphthene type solvent is to be employed, it is preferred to use a commercially available weak solvent. The weak solvent is one classified in the third class organic solvents in the classification of organic solvents by Industrial Safety and Health Act and is one member or a mixture of two or more members, selected from the group consisting of gasoline, coal tar naphtha (including solvent naphtha), petroleum ether, petroleum naphtha, petroleum benzin, turpentine oil and mineral spirit (including mineral thinner, petroleum spirit, white spirit and mineral terpene).

Further, a solvent having an aniline point of from 30° C. to 70° C. is preferred. The lower limit of the aniline point is further preferably 40° C., and the upper limit of the aniline point is further preferably 60° C. Here, the aniline point may be measured in accordance with the aniline point test method disclosed in JIS K2256.

As the weak solvent, a mineral spirit is preferred, since the flash point is at least room temperature. Solvents which are commonly sold as mineral spirits include, for example, HAWS (manufactured by Shell Japan, aniline point: 17° C.), ESSO NAPHTHA No. 6 (manufactured by Exxon Mobile Corporation, aniline point: 43° C.), LAWS (manufactured by Shell Japan, aniline point: 44° C.), PEGASOL 3040 (manufactured by Exxon Mobile Corporation, aniline point: 55° C.), A Solvent (manufactured by Nippon Oil Corporation, aniline point: 45° C.), CLENZOL (manufactured by Nippon Oil Corporation, aniline point: 64° C.), Mineral Spirit A (manufactured by Nippon Oil Corporation, aniline point: 43° C.), Hiarom 2S (manufactured by Nippon Oil Corporation, aniline point: 44° C.), Hiarom 2S (manufactured by Nippon Oil Corporation, aniline point: 44° C.), LINEALENE 10, LINEALENE 12 (manufactured by Idemitsu Kosan Co., Ltd., α-olefin type hydrocarbon, aniline point: 44° C., 54° C.), EXXSOL D30, (manufactured by Exxon Mobile Corporation, naphthene type solvent, aniline point: 63° C.), RIKASOLVE 900, 910B, 1000 (manufactured by New Japan Chemical Co., Ltd., hydrogenated C9 solvent, aniline point: 53° C., 40° C., 55° C.), etc. As the weak solvent to be used in the present invention, it is possible to use one of them alone or two or more of them as mixed.

In a case where the photocurable fluorinated polymer composition of the present invention contains a weak solvent as the organic solvent, it is preferred to use such a weak solvent as the polymerization solvent for the photocurable fluorinated polymer (A), or to substitute the weak solvent for a part or whole of the solvent or dispersant after polymerization in another solvent. Further, the obtained composition may be subjected to the concentration adjustment, as the case requires, or another component may be added to the composition, as the case requires.

In a case where in the photocurable fluorinated polymer composition of the present invention, a solvent different from the polymerization solvent for the fluorinated polymer (A) is used as the solvent to dissolve the photocurable fluorinated polymer composition, it is preferred to substitute the desired organic solvent for a part or whole of the solvent or dispersant after the fluorinated polymer (A) is polymerized.

The content of the organic solvent in the photocurable fluorinated polymer composition of the present invention is suitably determined in consideration of a proper viscosity at the time of coating, the coating method, etc. The content of the organic solvent is preferably from 0 to 100.0 parts by mass, more preferably from 3.0 to 50.0 parts by mass, per 100 parts by mass of the polymer (A) in the photocurable fluorinated polymer composition. Here, the content of the organic solvent being 0 part by mass means that no organic solvent is added i.e. in the absence of a solvent.

The organic solvent contained in the photocurable fluorinated polymer composition of the present invention may be one type only or two or more types in combination.

3. Reactive Diluent

To the photocurable fluorinated polymer composition of the present invention, an organic solvent may be incorporated to lower the viscosity of the composition, depending upon the particular application, but such an organic solvent may bring about a problem at the time of curing the composition, such as foaming, swelling, cracking, etc. of the coating film containing the cured resin.

Therefore, it is preferred to use a reactive diluent in order to lower the viscosity of the composition and to improve the coating performance or working efficiency.

As such a reactive diluent, a compound having a functional group capable of cation polymerization and having a viscosity of at most 100 mPa·s is preferred.

Specifically, it is preferably a compound having at least one epoxy group, oxetane group or vinyl ether group in one molecule, and having a viscosity of at most 100 mP·s.

More specifically, it may, for example, be preferably an oxetane compound such as 3-ethyl-hydroxymethyloxetane (22.4 mPa·s), 2-ethylhexyloxetane (5.0 mPa·s), or 2-ethyl-3{[(3-ethyloxetan-3-yl)methoxy]methyl}oxetane (12.8 mPa·s); an epoxy compound such as butyl glycidyl ether (1.0 mPa·s), phenyl glycidyl ether (6.0 mPa·s), neopentyl glycol diglycidyl ether (17.0 mPa·s), 1,6-hexanediol diglycidyl ether (25.0 mPa·s), propylene glycol diglycidyl ether (12.0 mPa·s), tripropylene glycol diglycidyl ether (30.0 mPa·s), polypropylene glycol diglycidyl ether (53.0 mPa·s), diethylene glycol diglycidyl ether (22.0 mPa·s) or polyethylene glycol diglycidyl ether (60.0 mPa·s); or a vinyl ether compound such as cyclohexyl vinyl ether (0.7 mPa·s), triethylene glycol divinyl ether (3.3 mPa·s), trimethylol propane trivinyl ether (4.2 mPa·s), hydroxyethyl vinyl ether (2.6 mPa·s), hydroxybutyl vinyl ether (5.4 mPa·s), diethylene glycol monovinyl ether (4.7 mPa·s), 2-(2-vinyloxyethoxy)ethyl acrylate (3.7 mPa·s) or 2-(2-vinyloxyethoxy) ethyl methacrylate (3.2 mPa·s).

4. Antioxidant

With the photocurable fluorinated polymer composition of the present invention, there may be a case where an oxetane compound, an epoxy compound or a vinyl ether compound in the composition is oxidized in air even at room temperature to form a peroxide. The formed peroxide is thermally unstable in many cases, and is likely to be radically decomposed.

Further, by the formed radicals, an onium salt as the catalyst is likely to be decomposed to form an acid thereby to initiate cation polymerization.

Accordingly, especially in a case where an iodonium salt is used as a photopolymerization initiator, a problem is likely to occur with respect to the storage stability of the composition in many cases.

Therefore, in order to prevent deterioration of the storage stability, it is preferred to incorporate an antioxidant to the photocurable fluorinated resin composition. As such an antioxidant, a phenol type antioxidant, a phosphite type antioxidant or a thioether type antioxidant is preferred.

Specifically, a phenol type antioxidant such as 2-t-butyl-p-cresol, 2,6-di-t-butyl-p-cresol, 2,6-di-t-butyl-4-ethylphenol, 2,2'-methylenebis-(4-methyl-6-t-butylphenol, 2,2'- methylenebis-(4-ethyl-6-t-butylphenol, triethylene glycol bis[3-(3-(t-butyl-5-methyl-4-hydroxyphenyl) propionate], 1,6-hexanediol-bis[3-(3,5-di-t-butyl-5-methyl-4-hydroxyphenyl) propionate], pentaerythritol tetrakis[3-(3,5-di-t-butyl-5-methyl-4-hydroxyphenyl) propionate], octadecyl-3-(3, 5-di-t-butyl-5-methyl-4-hydroxyphenyl) propionate or 1,3, 5-trimethyl-2,4,6-tris(3,5-di-t-butyl-4-hydroxybenzyl) benzene; a phosphite type antioxidant such as triphenyl phosphite or tris(2,4-di-t-butylphenyl) phosphite; or a thioether type antioxidant such as bis(4-hydroxy-3-methylphenyl) sulfide, bis(4-hydroxyphenyl) sulfide, 4,4'-thiobis-(6-t-butyl-m-cresol, 4,4'-thiobis(6-t-butyl-o-cresol or 2,2'-thiobis-(4-t-octylphenol), may, for example, be preferred.

Among these antioxidants, 2-t-butyl-p-cresol or 2,6-di-t-butyl-p-cresol is more preferred, since it is readily available.

The antioxidant is added preferably in an amount of from 0.005 to 5.0 parts by mass, more preferably from 0.01 to 3.0 parts by mass, per 100 parts by mass of the fluorinated polymer (A) in the photocurable fluorinated polymer composition of the present invention. In a case where a plurality of antioxidants are used in combination for the photocurable fluorinated polymer composition, it is preferred that the total amount is within the above range.

When the amount of the antioxidant is at least 0.005 part by mass, the antioxidant will sufficiently function, and the storage stability of the photocurable composition can be well maintained. Further, even if it is used in excess of 5.0 parts by mass, no substantial distinct difference tends to be observed in the effects to prevent deterioration of the storage stability.

The antioxidant to be incorporated to the photocurable fluorinated resin composition may be one type alone or two or more types in combination, and it is more preferred to use two or more types in combination. Especially, a substantial synergistic effect can be obtained by using a phenol type antioxidant and a phosphite type antioxidant, or a phenol type antioxidant and a thioether type antioxidant, in combination.

To the photocurable composition of the present invention, an additive such as a rheology controlling agent, an antirust agent, a leveling agent, a defoaming agent, a surfactant, an antifouling agent or a silane coupling agent, or an inorganic component such as a pigment or a delustering agent may further be incorporated, as the case requires. The blend amount of such components may suitably be selected within a range not to impair the effects of the present invention.

5. Rheology Controlling Agent

The rheology controlling agent may, for example, be preferably a polyolefin type wax such as a castor wax (hardened castor oil or hydrogenated castor oil), bees wax or carnauba wax; a fatty acid amide such as stearic acid amide, hydroxy stearic acid bis amide, m-xylylene bis stearic acid amide, N,N'-distearyl isophthalic acid amide, N,N'-distearyl sebacic acid amide, N,N'-distearyl adipic acid amide, butylene bis hydroxy stearic acid amide, hexamethylene bis hydroxy stearic acid amide, hexamethylene bis biphenic acid amide, hexamethylene bis stearic acid amide, ethylene bis biphenic acid amide, ethylene bis hydroxy stearic acid amide, ethylene bis stearic acid amide, ethylene bis lauric acid amide, ethylene bis capric acid amide, ethylene bis caprylic acid amide, methylene bis hydroxy stearic acid amide, methylene bis lauric acid amide or methylene bis stearic acid amide; a substituted urea wax such as N-butyl-N'-stearylurea, N-phenyl-N'-stearylurea, N-stearyl-N'-stearylurea, xylylene bis stearylurea, toluoylene bis stearylurea, hexamethylene bis stearylurea, diphenylmethane bis stearylurea or diphenylmethane bis laurylurea; or a high molecular weight compound such as polyethylene glycol, polyethylene oxide, methylcellulose, ethylcellulose, or hydroxyethylcellulose.

6. Antirust Agent

The antirust agent may, for example, be preferably a triazole compound such as benzotriazole or methyl benzotriazole; an imidazole compound such as imidazole, methyl imidazole or 2,4,5-triphenyl imidazole; or a guanidine compound such as 1,3-diphenyl guanidine.

7. Leveling Agent

The leveling agent may, for example, be "POLYFLOW No. 7", "POLYFLOW No. 50E", "POLYFLOW No. 55", "POLYFLOW No. 75", "POLYFLOW No. 77", "POLYFLOW No. 85", "POLYFLOW No. S" or "POLYFLOW No. 90", tradename, manufactured by Kyoeisha Chemical Co., Ltd., "DISPARLON L-1980-50", "DISPARLON L-1982-50", "DISPARLON L-1983-50", "DISPARLON L-1984-50" or "DISPARLON L-1985-50", tradename, manufactured by Kusumoto Chemicals, Ltd., "SURFYNOL 104", "SURFYNOL 420", "SURFYNOL 440" or "SURFYNOL 465", tradename, manufactured by Air Products Japan, Inc., or "BYK-300" or "BYK-320", tradename, manufactured by BYK-Chemie.

8. Defoaming Agent

The defoaming agent may, for example, be "FLOWLEN AC-300HF", "FLOWLEN AC-326F", "FLOWLEN AC-901 HF", "FLOWLEN AC-903HF" or "FLOWLEN AC-1190HF", tradename, manufactured by Kyoeisha Chemical Co., Ltd., ""DISPARLON LAP-10", "DISPARLON LAP-20" or "DISPARLON LAP-30", tradename, manufactured by Kusumoto Chemicals, Ltd.

9. Surfactant

The surfactant may be nonionic type, cationic type or anionic type. Such a surfactant may, for example, be Reox ASE (tradename, manufactured by Daiichi Kogyo K. K.), a fluorine type surfactant "Surflon" (tradename, manufactured by AGC Seimi Chemical Co., Ltd.), an acrylic type "Modaflow" (tradename, manufactured by Monsanto) or "LEOFAT" series (tradename, manufactured by Kao Corporation).

10. Antifouling Agent

The antifouling agent is preferably a resin having an organosiloxane chain in its main chain or side chain, and specifically, it may, for example, be a hydroxy group-containing silicone resin, a methoxy group-containing silicone, an epoxy-modified silicone resin, a phenol-modified silicone resin, an acryl-modified silicone resin, a polyester-modified silicone resin, an alkyd-modified silicone resin or a silicone-modified acrylic resin.

Specifically, it may, for example, be BYK-Silclean 3700 (manufactured by BYK-Chemie Japan, solid content; 25%, hydroxy value: 120 mgKOH/g), X-22-160AS (manufactured by Shin-Etsu Chemical Co., Ltd., hydroxy value: 120 mgKOH/g), KF-6001 (manufactured by Shin-Etsu Chemical Co., Ltd., hydroxy value: 62 mgKOH/g) or XF42-B0970 (manufactured by Momentive Performance Materials Inc., hydroxy value: 60 mgKOH/g).

The antifouling agent to be incorporated to the photocurable fluorinated polymer composition may be one type only or two or more types in combination.

11. Silane Coupling Agent

The silane coupling agent may, for example, be preferably 3-mercaptopropyltrimethoxysilane, 3-isocyanate propyltriethoxysilane, bis(triethoxysilylpropyl)tetrasulfide, 3-mercaptopropylmethyldimethoxysilane, 3-chloropropyltrimethoxysilane, 3-ureidepropyltriethoxysilane, N-phenyl-3-aminopropyltrimethoxysilane, 3-triethoxysilyl-N-(1,3-dimethyl-butylidene)propylamine, 3-aminopropyltriethoxysilane, 3-aminopropyltrimethoxysilane, N-(2-aminoethyl)-3-aminopropyltriethoxysilane, N-(2-aminoethyl)-3-aminopropyltrimethoxysilane, N-(2-aminoethyl)-3-aminopropylmethyldimethoxysilane, 3-acryloyloxypropyltrimethoxysilane, 3-methacryloxypropyltriethoxysilane, 3-methacryloxypropylmethyldiethoxysilane, 3-methacryloxypropyltrimethoxysilane, 3-methacryloxypropylmethyldimethoxysilane, p-styryltrimethoxysilane, 3-glycidoxypropyltriethoxysilane, 3-glycidoxypropylmethyldiethoxysilane, 3-glycidoxypropyltrimethoxysilane, 2-(3,4-epoxycyclohexyl)ethyltrimethoxysilane, vinyltriethoxysilane, vinyltrimethoxysilane or vinyltrichlorosilane.

12. Pigment, Dye

The pigment may, for example, be preferably an inorganic pigment such as carbon black or titanium oxide, or an organic pigment such as phthalocyanine blue, phthalocyanine green, quinacridone red, indanthrene orange or isoindolinone yellow. Titanium oxide may, for example, be "A-190", tradename, manufactured by Sakai Chemical Industry Co., Ltd.

13. Delustering Agent

The delustering agent is preferably e.g. ultrafine powder synthetic silica. When a delustering agent is used, it is possible to form an elegant semi-gloss or delustered coating film.

The photocurable fluorinated polymer composition of the present invention may be produced by mixing the fluorinated polymer (A), the photoreaction initiator (B) and various additives which are added as the case requires. The order of mixing or the order of addition is not particularly limited.

After forming the photocurable fluorinated polymer composition of the present invention into a coating material, as a method for coating by using such a coating material, an optional method may be employed such as spray coating, brush coating, a dipping method, a roll coater method or a flow coater method.

At the time of curing the photocurable fluorinated polymer composition of the present invention or a coating film or a coating material containing such a composition, it is preferred to employ ultraviolet ray irradiation. Here, as the ultraviolet ray irradiation source, it is preferred to utilize a mercury lamp, a xenon lamp, a carbon arc, a metal halide lamp, sunlight, etc.

The conditions for irradiation with ultraviolet rays are not particularly limited, but it is preferred to apply a light beam including ultraviolet rays within a range of from 150 to 450 nm in air or in an inert gas atmosphere for at least a few seconds. Especially in an case where irradiation is carried out in air, it is preferred to use a high pressure mercury lamp. An apparatus to be used for the curing is not particularly limited, and it is possible to employ a curing apparatus such as a closed type curing furnace or a tunnel furnace whereby continuous curing is possible. Specifically, an inverter type conveyer (ECS-401 DX) manufactured by Eye Graphics Co., Ltd. or an ultraviolet ray irradiation apparatus "UVC-02516S1AA01" manufactured by Ushio Inc. may be mentioned.

To the photocurable fluorinated polymer composition of the present invention, a thermal curing catalyst may preliminarily be added, so that after curing by irradiation with light, the curing is accelerated by heating. An apparatus to be used for curing is not particularly limited, and it is possible to employ a curing apparatus such as a closed type curing furnace or a tunnel furnace whereby continuous curing is possible. The heating source is not particularly limited, and heating can be carried out by a method such as hot air circulation, infrared ray heating or high frequency heating.

The temperature and time required for the curing may vary depending upon the type of the thermal curing catalyst, etc. But usually, curing conditions at a temperature within a range of from 50 to 150° C. for from 1 to 10 hours, are preferred, and curing conditions at a temperature within a range of from 50 to 80° C. for from 30 minutes to 2 hours are more preferred.

The material for an article to be coated with a coating material containing the photocurable fluorinated polymer composition of the present invention is not particularly limited, and it may, for example, be an inorganic material such as concrete, a natural stone, glass, etc.; a metal such as iron, stainless steel, aluminum, copper, brass, titanium, etc.; or an organic material such as a plastic, rubber, adhesive, wood, etc. Further, FRP, resin-reinforced concrete, fiber-reinforced concrete, etc. may also be mentioned as organic/inorganic composite materials.

Articles to be coated may, for example, be transport equipments such as automobiles, electric cars, aircrafts, etc.; construction materials such as bridge components, iron towers, etc.; industrial materials such as water-proofing sheets, tanks, pipes, etc.; building materials such building exterior materials, doors, window materials, monuments, poles, etc.; road materials such as road dividers, guardrails, sound insulating walls, translucent plates made of polycarbonate, acrylic material, etc.; communication equipments; electrical and electronic components; solar cell back sheets, solar cell surface-protecting coating materials, etc.

EXAMPLES

Now, the present invention will be described in detail with reference to Examples, but it should be understood that the present invention is by no means restricted by these Examples.

Further, in the following Examples, the fluorinated polymer (A) will be referred to as component A, the photoreaction initiator (B) will be referred to as component B, and the compound (C) will be referred to as component C.

Production Example 1: Production of Fluorinated Polymer (A-1)

Into a stainless steel autoclave having an internal capacity of 300 ml and equipped with a stirrer, 3-ethyl-3-vinyloxymethyloxetane (55.8 g), xylene (95.0 g), ethanol (17.7 g) and potassium carbonate (1.0 g) were introduced all at once, and dissolved oxygen was removed by nitrogen.

Then, chlorotrifluoroethylene (45.8 g) was introduced into the autoclave, the temperature was gradually raised, and when it reached 55° C., a xylene solution (0.6 g) containing 50% of t-butyl peroxypivalate was introduced into the autoclave over a period of two hours, followed by further stirring for 15 hours, whereupon the reaction was terminated. After the reaction, potassium carbonate was removed by filtration, and ethanol was distilled off by evaporation so that a non-volatile component of the fluorinated polymer (A-1) would be 50%.

The infrared absorption spectrum of the obtained solution was measured, whereby an absorption peak of an oxetanyl group was observed, and thus, formation of the fluorinated polymer (A-1) was confirmed.

From $H^1$—NMR, the composition of the obtained fluorinated polymer (A-1) was found to be units of CTFE/units of 3-ethyl-3-vinyloxymethyloxetane=50/50 mol %.

Production Example 2: Production of Fluorinated Polymer (A-2)

Into a stainless steel autoclave having an internal capacity of 300 ml and equipped with a stirrer, 3-ethyl-3-vinyloxymethyloxetane (33.5 g), n-propyl vinyl ether (16.9 g), xylene (95.0 g), ethanol (17.7 g) and potassium carbonate (1.0 g) were introduced all at once, and dissolved oxygen was removed by nitrogen.

Then, chlorotrifluoroethylene (45.8 g) was introduced into the autoclave, the temperature was gradually raised, and after it reached 55° C., a xylene solution (0.6 g) containing 50% of t-butyl peroxypivalate was introduced into the autoclave over a period of two hours, followed by further stirring for 15 hours, whereupon the reaction was terminated. After the reaction, potassium carbonate was removed by filtration, and ethanol was distilled off by evaporation so that a non-volatile component of the fluorinated polymer (A-2) would be 50%.

The infrared absorption spectrum of the obtained solution was measured, whereby an absorption peak of an oxetanyl group was observed, and thus formation of the fluorinated polymer (A-2) was confirmed.

From $H^1$-NMR, the composition of the obtained fluorinated polymer (A-2) was found to be units of CTFE/units of 3-ethyl-3-vinyloxymethyloxetane/units of n-propyl vinyl ether=50/30/20 mol %.

Production Example 3: Production of Fluorinated Polymer (A-3)

Into a stainless steel autoclave having an internal capacity of 300 ml and equipped with a stirrer, 3-ethyl-3-vinyloxymethyloxetane (33.5 g), hydroxyethyl vinyl ether (17.3 g), xylene (95.0 g), ethanol (17.7 g) and potassium carbonate (1.0 g) were introduced all at once, and dissolved oxygen was removed by nitrogen.

Then, chlorotrifluoroethylene (45.8 g) was introduced into the autoclave, the temperature was gradually raised, and after it reached 55° C., a xylene solution (0.6 g) containing 50% of t-butyl peroxypivalate was introduced into the autoclave over a period of two hours, followed by further stirring for 15 hours, whereupon the reaction was terminated. After the reaction, potassium carbonate was removed by filtration, and ethanol was distilled off by evaporation so that a non-volatile component of the fluorinated polymer (A-3) would be 50%.

The infrared absorption spectrum of the obtained solution was measured, whereby an absorption peak of an oxetanyl group and a peak of a hydroxy group were observed, and thus, formation of the fluorinated polymer (A-3) was confirmed.

From $H^1$-NMR, the composition of the obtained fluorinated polymer (A-3) was found to be units of CTFE/units of 3-ethyl-3-vinyloxymethyloxetane/units of hydroxyethyl vinyl ether=50/30/20 mol %.

Production Example 4: Production of Fluorinated Polymer (A-4)

Into a stainless steel autoclave having an internal capacity of 300 ml and equipped with a stirrer, 3-ethyl-3-vinyloxymethyloxetane (10.6 g), vinyl acetate (25.6 g), xylene (95.0 g), ethanol (17.7 g) and potassium carbonate (1.0 g) were introduced all at once, and dissolved oxygen was removed by nitrogen.

Then, chlorotrifluoroethylene (45.8 g) was introduced into the autoclave, the temperature was gradually raised, and after it reached 55° C., a xylene solution (0.6 g) containing 50% of t-butyl peroxypivalate was introduced into the autoclave over a period of two hours, followed by further stirring for 15 hours, whereupon the reaction was terminated. After the reaction, potassium carbonate was removed by filtration, and ethanol was distilled off by evaporation so that a non-volatile component of the fluorinated polymer (A-4) would be 50%.

The infrared absorption spectrum of the obtained solution was measured, whereby an absorption peak of an oxetanyl group was observed, and thus, formation of the fluorinated polymer (A-4) was confirmed.

From $H^1$-NMR, the composition of the obtained fluorinated polymer (A-4) was found to be units of CTFE/units of 3-ethyl-3-vinyloxymethyloxetane/units of vinyl acetate=50/10/40 mol %.

Production Example 5: Production of Epoxy Group-Containing Fluorinated Polymer (α)

Into a stainless steel autoclave having an internal capacity of 300 ml and equipped with a stirrer, glycidyl vinyl ether (23.6 g), n-propyl vinyl ether (16.9 g), xylene (95.0 g), ethanol (17.7 g) and potassium carbonate (1.0 g) were introduced all at once, and dissolved oxygen was removed by nitrogen.

Then, chlorotrifluoroethylene (45.8 g) was introduced into the autoclave, the temperature was gradually raised, and after it reached 55° C., a xylene solution (0.6 g) containing 50% of t-butyl peroxypivalate was introduced into the autoclave over a period of two hours, followed by further stirring for 15 hours, whereupon the reaction was terminated. After the reaction, potassium carbonate was removed by filtration, and ethanol was distilled off by evaporation so that a non-volatile component of the epoxy group-containing fluorinated polymer (a) would be 50%.

The infrared absorption spectrum of the obtained solution was measured, whereby an absorption peak of an epoxy group was observed, and thus, formation of the fluorinated polymer (α) was confirmed.

From $H^1$-NMR, the composition of the obtained fluorinated polymer (α) was found to be units of CTFE/units of glycidyl vinyl ether/units of n-propyl vinyl ether=50/30/20 mol %.

Examples 1 to 4 and Comparative Examples 1 and 2

Using raw materials shown in Table 1 in blend proportions (unit: parts by mass) shown in Table 1, a clear coating material composition was prepared.

The obtained clear coating material composition was applied to a chromate-treated surface of an aluminum plate so that the film thickness would be 250 μm.

Then, ultraviolet rays (UV) were applied under the following conditions by means of a conveyer type ultraviolet ray irradiation apparatus to obtain a coating film-attached test plate.

With respect to the coating film-attached test plate thus obtained, "gel fraction of coating film", "solvent resistance of coating film" and "adhesion of coating film" were evaluated by the following test methods. The results are shown in Table 1.

UV Curing Conditions
UV irradiation apparatus: Inverter type conveyer "ECS-401GX" manufactured by Eye Graphics Co., Ltd.

Lamp: a metal halide lamp and a high pressure mercury lamp are used in combination.
Irradiation condition: 1 kW
Conveyer speed: 162 cm/min
Number of irradiation: once The materials used in the following Table 1 and their abbreviations are as follows.

"Irgacure 250": photoreaction initiator, manufactured by Ciba Specialty Chemicals "CELLOXIDE 2021P": 3,4-epoxycyclohexenylmethyl-3',4'-epoxycyclohexene carboxylate, manufactured by Daicel Chemical Industries, Ltd.

"Aron Oxetane OXT-221": 3-ethyl-3{[(3-ethyloxetan-3-yl)methoxy]methyl}oxetane, manufactured by Toagosei Co., Ltd.

"CHDVE": 1,4-cyclohexanedimethanol divinyl ether, manufactured by Nippon Carbide Industries Co., Inc.

[Test Methods]

1. Gel Fraction

A coating film having a thickness of 250 μm obtained in each of Examples 1 to 4 and Comparative Examples 1 and 2 was immersed in acetone and extracted for two hours under a refluxing condition. The initial weight before extraction and the weight after extraction and drying, were measured, and the gel fraction was calculated by the following formula.

Gel fraction (%)=(weight after extraction and drying)/(initial weight before extraction)×100

2. Solvent Resistance

A coating film obtained in each of Examples 1 to 4 and Comparative Examples 1 and 2, was rubbed 100 times with a gauze having xylene impregnated, whereby the state of the coating film was evaluated by the following standards.

◯: No dissolution of coating film observed
Δ: No dissolution of coating film, but scratches observed
X: Dissolution of coating film observed 3. Adhesion (Crosscut Test)

Measured in accordance with JIS Z5400 8.5.

Examples 5 to 9 and Comparative Example 3

The pigment, component A, component C and the organic solvent shown in Table 2 were mixed and dispersed by a rocking mill for one hour to obtain a coating material stock solution. Then, to this coating material stock solution, the photoreaction initiator, the photosensitizer and the leveling agent were added, followed by stirring and mixing until the respective materials were uniformly dissolved thereby to obtain a white enamel coating material composition.

The obtained white enamel coating material composition was applied to a chromate-treated surface of an aluminum plate so that the film thickness became 50 μm.

Then, ultraviolet rays (UV) were applied under the following conditions by means of a conveyer type ultraviolet ray irradiation apparatus to obtain a coating film-attached test plate.

With respect to the coating film-attached test plate thus obtained, "specular gloss of coating film", "solvent resistance of coating film", "adhesion of coating film" and "weather resistance of coating film" were evaluated by the following test methods. The results are shown in Table 2.

UV Curing Conditions
UV irradiation apparatus: Inverter type conveyer "ECS-401 GX" manufactured by Eye Graphics Co., Ltd.
Lamp: A metal halide lamp and a high pressure mercury lamp are used in combination
Irradiation condition: 1 kW
Conveyer speed: 162 cm/min
Number of irradiation: once The materials used in the following Table 2 and their abbreviations are as follows.

"CPI-101A": photoreaction initiator, manufactured by San-Apro Ltd.

"CPI-200K": photoreaction initiator, manufactured by San-Apro Ltd.

"Irgacure 250": photoreaction initiator, manufactured by Ciba Specialty Chemicals "UVS-1331": photosensitizer (9,10-dibutoxyanthracene), manufactured by Kawasaki Kasei Chemicals Ltd.

TABLE 1

| | | | Example | | | | Comparative Example | |
|---|---|---|---|---|---|---|---|---|
| | | | 1 | 2 | 3 | 4 | 1 | 2 |
| Blend composition (parts by weight) | Component A | Fluorinated polymer (A-1) | 100.0 | — | — | — | — | — |
| | | Fluorinated polymer (A-2) | — | 100.0 | — | — | — | — |
| | | Fluorinated polymer (A-3) | — | — | 100.0 | — | — | — |
| | | Fluorinated polymer (A-4) | — | — | — | 100.0 | — | — |
| | | Fluorinated polymer (α) | — | — | — | — | 100.0 | 100.0 |
| | Component B | Irgacure 250 | 1.5 | 3.0 | 2.0 | 3.0 | 1.5 | 3.0 |
| | Component C | CELLOXIDE 2021P | — | 25.0 | 25.0 | 20.0 | — | 25.0 |
| | | Aron Oxetane OXT-221 | — | 25.0 | — | 20.0 | — | 25.0 |
| | | CHDVE | — | — | — | 10.0 | — | — |
| | | Sum | 101.5 | 153.0 | 127.0 | 153.0 | 101.5 | 153.0 |
| Evaluation results | | Gel fraction (%) | 95.6 | 96.2 | 94.9 | 93.0 | 55.2 | 65.3 |
| | | Solvent resistance | ◯ | ◯ | ◯ | ◯ | Δ | Δ |
| | | Adhesion | ◯ | ◯ | ◯ | ◯ | ◯ | ◯ |

"CELLOXIDE 201P": 3,4-epoxycyclohexenylmethyl-3',4'-epoxycyclohexene carboxylate, manufactured by Daicel Chemical Industries Ltd.

"Aron Oxetane OXT-221": 3-ethyl-3{[(3-ethyloxetan-3-yl)methoxy]methyl}oxetane, manufactured by Toagosei Co., Ltd.

"A-190": titanium oxide pigment (manufactured by Sakai Chemical Industry Co., Ltd.)

"BYK-300": leveling agent (manufactured by BYK-Chemie)

"CPME": cyclopentyl methyl ether, manufactured by Zeon Corporation

[Test Methods]

1. Specular Gloss of Coating Film

Measured in accordance with JIS Z5400 7.6.

2. Solvent Resistance

A coating film obtained in each of Examples 5 to 9 and Comparative Example 3 was rubbed 100 times with a gauze having xylene impregnated, whereby the state of the coating film was evaluated by the following standards.

◯: No dissolution of coating film observed
Δ: No dissolution of coating film, but scratches observed
X: Dissolution of coating film observed 3. Adhesion (Crosscut Test)

Measured in accordance with JIS Z5400 8.5.

4. Weather Resistance of Coating Film

A coating film-attached test plate was set outdoors in Naha City in Okinawa Prefecture, and the gloss of the coating film surface was measured immediately before setting and after two years by means of PG-1 M (gloss meter, manufactured by Nippon Denshoku Industries Co., Ltd.). The proportion of the value of the gloss after two years, to 100% of the value of the gloss immediately before setting was calculated as the gloss retention (unit: %). Evaluation of the weather resistance was carried out by the following standards.

◯: Gloss retention being at least 80%
Δ: Gloss retention being at least 60% and less than 80%
X: Gloss retention being less than 60%

As shown in Examples 1 to 9 in Tables 1 and 2, it is possible to provide a photocurable fluorinated polymer composition whereby the curing rate is high and it is possible to form even a thick coating film and which is excellent in solvent resistance and weather resistance. Further, the photocurable fluorinated polymer composition of the present invention presents no adverse influence to the working environment at the time of producing the composition, at the time of preparing a coating material or at the time of applying the coating material.

On the other hand, in Comparative Examples 1 to 3 in Tables 1 and 2, the curing rate was slow, whereby the curing property of the coating film was poor, and the solvent resistance and weather resistance of the obtained coating film were inadequate.

INDUSTRIAL APPLICABILITY

The photocurable fluorinated polymer composition of the present invention is useful as a coating material for coating articles made of materials such as metals, inorganic materials or organic materials. The articles to be thereby coated may, for example, be transport instruments, construction materials, industrial materials, building materials, road materials, communication instruments, electrical and electronic components, solar cell back sheets, solar cell surface protective coating materials, etc.

This application is a continuation of PCT Application No. PCT/JP2010/064022, filed Aug. 19, 2010, which is based upon and claims the benefit of priority from Japanese Patent Application No. 2009-191148 filed on Aug. 20, 2009. The contents of those applications are incorporated herein by reference in its entirety.

What is claimed is:

1. A photocurable fluorinated polymer composition comprising a fluorinated polymer (A) consisting of polymerized

TABLE 2

| | | | Example | | | | | | Comp. Ex. |
|---|---|---|---|---|---|---|---|---|---|
| | | | 5 | 6 | 7 | 8 | 9 | | 3 |
| Blend composition (parts by weight) | Component A | Fluorinated polymer (A-1) | 100.0 | 100.0 | — | — | — | | — |
| | | Fluorinated polymer (A-2) | — | — | 100.0 | 100.0 | 100.0 | | — |
| | | Fluorinated polymer (α) | — | — | — | — | — | | 100.0 |
| | Component B | Irgacure 250 | — | — | 1.0 | — | — | | — |
| | | CPI-101A | 0.5 | 1.0 | — | 1.0 | — | | 1.0 |
| | | CPI-200K | — | — | — | — | 1.0 | | — |
| | Component C | CELLOXIDE 2021P | — | 15.0 | 15.0 | 15.0 | 15.0 | | 15.0 |
| | | Aron Oxetane OXT-221 | — | 15.0 | 15.0 | 15.0 | 15.0 | | 15.0 |
| | Sensitizer | UVS-1331 | 0.3 | 0.3 | 0.3 | 0.3 | 0.3 | | 0.3 |
| | Additive | BYK-300 | 0.1 | 0.1 | 0.1 | 0.1 | 0.1 | | 0.1 |
| | Solvent | CPME | 5.0 | 5.0 | 5.0 | 5.0 | 5.0 | | 5.0 |
| | Pigment | A-190 | 12.0 | 12.0 | 12.0 | 12.0 | 12.0 | | 12.0 |
| | | Sum | 117.9 | 148.4 | 148.4 | 148.4 | 148.4 | | 148.4 |
| Evaluation results | | Specular gloss | 88.6 | 85.6 | 87.2 | 86.9 | 86.9 | | 85.3 |
| | | Solvent resistance | ◯ | ◯ | ◯ | ◯ | ◯ | | □ |
| | | Adhesion | ◯ | ◯ | ◯ | ◯ | ◯ | | ◯ |
| | | Weather resistance of coating film | ◯ | ◯ | ◯ | ◯ | ◯ | | X | units polymerized units (a-1) derived from chlorotrifluoroethylene, polymerized units (a-2) derived from an unsaturated monomer having an oxetanyl group or a substituted oxetanyl group, and optionally polymerized units (a-3) derived from a monomer which does not comprise a fluorine atom, an oxetanyl group or a substituted oxetanyl group, a photoreaction initiator (B), wherein the unsaturated monomer having an oxetanyl group or a substituted oxetanyl group, is a compound represented by the following formula (1):

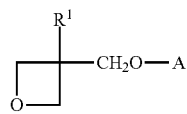
(1)

wherein in the formula (1), $R^1$ is a hydrogen atom or a $C_{1-6}$ alkyl group which may have an etheric oxygen atom, and A is a vinyl group, an allyl group, or an isopropenyl group, and a compound (C) which has at least one of at least one group selected from the group consisting of an epoxy group, an oxetanyl group, a substituted oxetanyl group, a vinylether group and a cyclic carbonate group and which does not have a fluorine atom, wherein the fluorinated polymer (A) has a fluorine content of from 10 to 35 mass %, the photoreaction initiator (B) is a photoreaction initiator which generates cations by ultraviolet rays to initiate a curing reaction and is an onium salt of a Lewis acid or an onium salt of a Bronsted acid, and the compound (C) is at least one compound (c-1) selected from the group consisting of a bisphenol A type epoxy resin, a hydrogenated bisphenol A type epoxy resin, a bisphenol F type epoxy resin, a hydrogenated bisphenol F type epoxy resin, a novolac type epoxy resin, a hydrogenated novolac type epoxy resin, a biphenyl type epoxy resin, a naphthalene type epoxy resin, an alicyclic epoxy resin, a triphenolmethane type epoxy resin, a dicyclopentadiene type epoxy resin, a terpene type epoxy resin, a bisarylfluorene type epoxy resin, an epoxy group-containing organopolysiloxane and an epoxy group-containing polymer, or is at least one compound (c-2) selected from the group consisting of compounds represented by the following formulae (2) to (4) and a polymer which has the polymerized units (a-2) derived from an unsaturated monomer having an oxetanyl group or a substituted oxetanyl group and which has no fluorine atom:

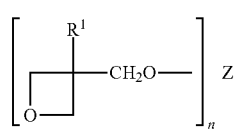
(2)

wherein in the formula (2), $R^1$ is a hydrogen atom or a $C_{1-6}$ alkyl group which may have an etheric oxygen atom, Z is an n-valent hydrocarbon group which may have a substituent, and n is an integer of from 1 to 4,

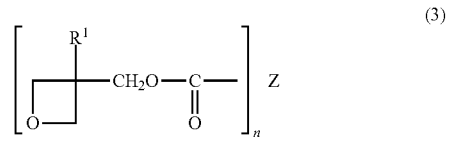
(3)

wherein in the formula (3), $R^1$ is a hydrogen atom or a $C_{1-6}$ alkyl group which may have an etheric oxygen atom, Z is an n-valent hydrocarbon group which may have a substituent, and n is an integer of from 1 to 4,

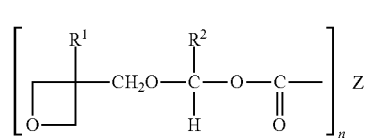
(4)

wherein in the formula (4), $R^1$ is a hydrogen atom or a $C_{1-6}$ alkyl group which may have an etheric oxygen atom, $R^2$ is a $C_{1-6}$ linear or branched alkyl group which may have an etheric oxygen atom, Z is an n-valent hydrocarbon group which may have a substituent, and n is an integer of from 1 to 4, or is at least one compound (c-3) which has at least one vinylether group in one molecule, wherein in the fluorinated polymer (A), the proportion of the polymerized units (a-1) derived from chlorotrifluoroethylene is from 30 to 70 mol %, and the proportion of the polymerized units (a-2) derived from an unsaturated monomer having an oxetanyl group or a substituted oxetanyl group, is from 70 to 30 mol %, to the total number of moles of the polymerized units (a-1) derived from chlorotrifluoroethylene and the polymerized units (a-2) derived from an unsaturated monomer having an oxetanyl group or a substituted oxetanyl group, and wherein the photoreaction initiator (B) is at least one photoreaction initiator selected from the group consisting of a diaryl iodonium salt, a triaryl sulfonium salt and an aryl diazonium salt.

2. The photocurable fluorinated polymer composition according to claim 1, wherein the fluorinated polymer (A) consists of polymerized units (a-1), (a-2), and (a-3), wherein the polymerized units (a-3) are derived from an unsaturated monomer which has no fluorine atom, oxetanyl group or substituted oxetanyl group and which has at least one group selected from the group consisting of an alkenyl group, an alkenyloxy group, a vinyloxycarbonyl group and a (meth)acryloyl group, in a proportion of from 5 to 45 mol % to all polymerized units in the fluorinated polymer (A).

3. The photocurable fluorinated polymer composition according to claim 2, wherein the polymerized units (a-3) are polymerized units (a-3a) having a $C_{1-10}$ alkyl group and no crosslinkable functional group.

4. The photocurable fluorinated polymer composition according to claim 2, wherein the polymerized units (a-3) are polymerized units (a-3b) having a crosslinkable functional group.

5. The photocurable fluorinated polymer composition according to claim 1, wherein the compound (C) is said at least one compound (c-1).

6. The photocurable fluorinated polymer composition according to claim 1, wherein the compound (C) is said at least one compound (c-2).

7. The photocurable fluorinated polymer composition according to claim 1, wherein the compound (C) is said at least one compound (c-3).

8. The photocurable fluorinated polymer composition according to claim 1, wherein the polymerized units (a-2) are derived from 3-ethyl-3-vinyloxymethyloxetane.

9. The photocurable fluorinated polymer composition according to claim 1, further comprising an antioxidant.

10. The photocurable fluorinated polymer composition according to claim 9, wherein an amount of the antioxidant is from 0.005 to 5.0 parts by mass based on 100 parts by mass of the fluorinated polymer (A).

11. The photocurable fluorinated polymer composition according to claim 9, wherein an amount of the antioxidant is from 0.01 to 3.0 parts by mass based on 100 parts by mass of the fluorinated polymer (A).

* * * * *